United States Patent
Taguchi et al.

(10) Patent No.: US 7,311,393 B2
(45) Date of Patent: *Dec. 25, 2007

(54) INKJET RECORDING INK AND METHOD OF INKJET RECORDING

(75) Inventors: Toshiki Taguchi, Shizuoka (JP); Takashi Ozawa, Shizuoka (JP); Akio Miyamoto, Shizuoka (JP); Naotaka Wachi, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 10/525,386

(22) PCT Filed: Jul. 1, 2003

(86) PCT No.: PCT/JP03/08374

§ 371 (c)(1),
(2), (4) Date: Feb. 23, 2005

(87) PCT Pub. No.: WO2004/018574

PCT Pub. Date: Mar. 4, 2004

(65) Prior Publication Data

US 2006/0055750 A1 Mar. 16, 2006

(30) Foreign Application Priority Data

| Aug. 26, 2002 | (JP) | ............................. 2002-244930 |
| Aug. 29, 2002 | (JP) | ............................. 2002-250969 |
| Aug. 29, 2002 | (JP) | ............................. 2002-250995 |
| Aug. 29, 2002 | (JP) | ............................. 2002-250996 |
| Aug. 29, 2002 | (JP) | ............................. 2002-251514 |
| Aug. 29, 2002 | (JP) | ............................. 2002-251515 |

(51) Int. Cl.
*G01D 11/00* (2006.01)
(52) U.S. Cl. ...................... 347/100; 347/95; 106/31.27
(58) Field of Classification Search ................. 347/100, 347/95, 96, 101; 106/31.27, 31.46, 31.13, 106/31.6; 523/160
See application file for complete search history.

(56) References Cited

U.S. PATENT DOCUMENTS

| 5,749,951 | A | 5/1998 | Yoshiike et al. |
| 7,022,170 | B2 * | 4/2006 | Taguchi et al. ........... 106/31.46 |
| 7,083,664 | B2 * | 8/2006 | Taguchi et al. ........... 106/31.27 |
| 2001/0029869 | A1 * | 10/2001 | Fujiwara ..................... 347/100 |

FOREIGN PATENT DOCUMENTS

| CN | 1151423 A | 6/1997 |
| JP | 9-170181 A | 6/1997 |

OTHER PUBLICATIONS

Chinese Office Action dated Aug. 25, 2006.
International Search Report for PCT/JP03/08374 dated Oct. 7, 2003.

* cited by examiner

*Primary Examiner*—Manish S. Shah
(74) *Attorney, Agent, or Firm*—Sughrue Mion, PLLC

(57) ABSTRACT

The object of the present invention is to provide an inkjet recording ink ensuring excellent ejection stability even after aging of the ink and also exhibiting excellent weather resistance; provide an inkjet recording ink ensuring less blurring of the image drawn, in addition to excellent ejection stability and weather resistance; and provide a yellow ink and a dark yellow ink, which can contribute to realization of a pictorial quality with excellent color balance as a constituent ink of an ink set. These objects of the present invention can be achieved by an inkjet recording ink including an aqueous medium containing a yellow dye, particularly, a yellow dye represented by formula (1), having spectral absorption characteristics such that the maximum absorption wavelength is in the region from 390 to 470 nm and the absorption long-wave end has a tailing of a specified value or less, and antioxidative characteristics such that the ozone enforced discoloration rate constant is $5.0 \times 10^{-2}$ [hour$^{-1}$] or less. Furthermore, when the ink contains a diamino compound represented by formula (A), a carbonyl group (or sulfo group or the like)-containing cyclic compound represented by formula (B) and an organic solvent having a specific structure, the effect of the present invention is enhanced.

29 Claims, No Drawings

INKJET RECORDING INK AND METHOD OF INKJET RECORDING

TECHNICAL FIELD

The present invention relates to an inkjet recording ink and a recording method using the ink, more specifically, the present invention relates to an inkjet recording Ink and an inkjet recording method, which can realize image drawing with high ejection stability and give an image having excellent preservability.

BACKGROUND ART

With recent popularization of computers, an inkjet printer is widely used for printing letters or drawing an image on paper, film, cloth or the like not only at offices but also at homes.

The inkjet recording method includes a system of ejecting a liquid droplet by applying a pressure from a piezoelectric element, a system of ejecting a liquid droplet by generating a bubble in the ink under heat, a system of using an ultrasonic wave, and a system of ejecting a liquid droplet by suction using an electrostatic force. The inkjet recording ink used therefor includes an aqueous ink, an oily ink and a solid (fusion-type) ink.

Among these inks, an aqueous ink is relatively superior to oily ink or solid (fusion-type) ink in view of possibility of satisfying all of production, handleability, odor, safety and the like and therefore, is predominating as the inkjet recording ink at present.

The coloring material used in such an inkjet recording ink is required to have high solubility in a solvent (ink medium), enable high-density recording, provide good color hue, exhibit excellent fastness to light, heat, air, water and chemicals, ensure good fixing to an image-receiving material and less blurring, give an ink having excellent storability, have high purity and no toxicity, and be available at a low cost. Various dyes and pigments for use in inkjet recording have been already proposed and are actually used, but a coloring material satisfying all of the above-described requirements is not yet found out at present.

For example, conventionally well-known dyes and pigments such as coloring material having a color index (C.I.) number can hardly satisfy all of those various properties required of the inkjet recording ink.

As for the magenta dye capable of improving the image fastness, azo dyes derived from an aromatic amine and a 5-membered heterocyclic amine have been proposed in Patent Document 1. Furthermore, dyes excellent also in view of color hue are disclosed in Patent Documents 2 and 3. In addition, the color hue and fastness to light are more enhanced by the compounds described in Patent Document 4 or the pyrazolylazoaniline dyes described in Patent Document 5.

As for the cyan dye, phthalocyanine dyes excellent in the water solubility or dispersibility and at the same time, improved in the color hue and fastness to light have been proposed in Patent Documents 6 to 10.

Despite these improvements of the magenta dye and cyan dye, it is required that the yellow dye also has image fastness (namely, preservability) comparable to those of the magenta and cyan dyes so as to draw an image free from change of color hue in aging and capable of maintaining an excellent pictorial quality. However, such a desired yellow dye is not known and therefore, when the image is stored and aged in a place having a strongly oxidative atmosphere such as bright room or outdoors or in a high-temperature and high-humidity place, there arises a problem in many cases that the yellow dye is discolored and the color balance is disrupted.

In addition to the problem of satisfying both color hue and fastness, the aqueous yellow ink is also deficient in that the ejection property is readily worsened and the stability in the state of being charged in a printer is not sufficiently high.

Furthermore, the ink using only water as the dissolution or dispersion medium at the preparation of an ink solution exhibits poor penetrability into the recording medium (such as paper) and the image is often not fixed. Also, the liquid properties necessary for the hitting as an ink are not satisfied in many cases. In order to solve these problems, a technique of using a water-miscible high-boiling point organic solvent as an auxiliary solvent is generally employed in this field. However, it has been found that when a high boiling point organic solvent is used in a large amount, the image formed is disadvantageously liable to blur under high-humidity conditions.

In addition, the aqueous ink is readily putrefied and when the ink is aged for a long time, the ejection property is more deteriorated due to putrefaction. Even if an antiseptic is used in order to maintain the physical properties or ejection property of the ink, the effect of the antiseptic is unstable and can be hardly maintained because the fungus gains resistance.

As described above, the yellow ink for inkjet recording is failing in sufficiently satisfying both excellent image preservability against light, heat and high humidity, and excellent ejection stability at the image drawing. Realization of a yellow ink satisfied in both of these requirements is demanded on the market. Additionally, it is necessary to bring about no blurring of the image drawn and no fluctuation in the liquid properties due to putrefaction or other causes.

[List of Patent Documents as Background Art]

The documents described in the Background Art are as follows.

| | |
|---|---|
| [Patent Document 1] | JP-A-55-161856 (the term "JP-A" as used herein means an "unexamined published Japanese patent application") |
| [Patent Document 2] | JP-A-61-36362 |
| [Patent Document 3] | JP-A-2-212566 |
| [Patent Document 4] | JP-T-11-504958 (the term "JP-T" as used herein means a "published Japanese translation of a PCT patent application") |
| [Patent Document 5] | Japanese Patent Application No. 2000-80733 |
| [Patent Document 6] | JP-A-2003-3086 |
| [Patent Document 7] | JP-A-2003-3099 |
| [Patent Document 8] | JP-A-2003-3109 |
| [Patent Document 9] | JP-A-2003-12952 |
| [Patent Document 10] | JP-A-2003-12956 |

An object of the present invention is to solve the problems of the yellow ink and the like for inkjet recording described in the Background Art, more specifically, an object of the present invention is to provide an inkjet recording ink ensuring excellent ejection stability even after aging of the ink and also exhibiting excellent weather resistance.

Another object of the present invention is to provide an inkjet recording ink ensuring less blurring of the image drawn, in addition to excellent ejection stability and excellent weather resistance.

A still another object of the present invention is to provide a yellow ink, a dark yellow ink and a black ink, which can ensure a pictorial quality with excellent color balance when combined with magenta and cyan inks, in addition to excellent ejection stability, excellent weather resistance and no blurring of image.

DISCLOSURE OF THE INVENTION

These objects of the present invention can be attained by the inkjet recording ink described in the following (1) to (28). This inkjet recording ink is used for inkjet recording performed by the method described in (29) below. In particular, the effect of the present invention is remarkably brought out when the image recording is performed on the image-receiving layer of the image recording material described in (30) below.

(1) An inkjet recording ink comprising an aqueous medium having dissolved and/or dispersed therein at least one dye having λmax in the region from 390 to 470 nm and having a ratio of the absorbance I(λmax+70 nm) at λmax+70 nm to the absorbance I(λmax) at λmax, namely, I(λmax+70 nm)/I(λmax), of 0.4 or less, wherein when the reflection density after printing an image with the ink on a reflective image-receiving medium is measured through a Status A blue filter and the point having a reflection density ($D_B$) of 0.90 to 1.10 in the yellow region is defined as the initial density of the ink and when this printed image is enforcedly discolored by using an ozone discoloration tester capable of always generating 5 ppm of ozone and the enforced discoloration rate constant is determined from the time until the reflection density decreases to 80% of the initial density, the enforced discoloration rate constant is $5.0 \times 10^{-2}$ [hour$^{-1}$] or less.

(2) The inkjet recording ink as described in (1) above, wherein the ratio of the absorbance I(λmax+70 nm) at λmax+70 nm to the absorbance I(λmax) at λmax, namely, I(λmax+70 nm)/I(λmax), is 0.2 or less.

(3) The yellow ink for inkjet recording as described in (1) or (2) above, wherein the oxidation potential of the dye is nobler than 1.0 V (vs SCE).

(4) The inkjet recording ink as described in any one of (1) to (3) above, which comprises at least one compound represented by the following formula (A):

Formula (A):

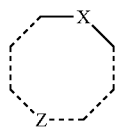

wherein X represents a carbonyl- or heteroatom-containing group and Z represents an atomic group capable of constituting a cyclic organic material.

(5) The inkjet recording ink as described in any one of (1) to (4) above, which comprises at least one compound represented by the following formula (B):

X-Y-Z                Formula (B):

wherein X represents a group represented by —N($Q_1$)-$Q_2$, Z represents a group represented by —N($Q_1$)-$Q_2$ or —O-$Q_3$, Y represents a group represented by —W-(G)$_k$-(H)$_n$—, W and H each represents a group represented by —CO—, —SO$_2$— or —PO($Q_4$)-, G represents a divalent linking group, $Q_1$ to $Q_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group, X and Z may combine with each other to form a ring, and k and n each represents 0 or 1.

(6) The inkjet recording ink as described in any one of (1) to (5) above, which comprises at least one antiseptic.

(7) The inkjet recording ink as described in (6) above, which comprises two or more different antiseptics.

(8) The inkjet recording ink as described in any one of (1) to (7) above, which comprises an organic solvent having a boiling point of 150° C. or more.

(9) The inkjet recording ink as described in any one of (1) to (8) above, which comprises at least one organic solvent having a boiling point of 150° C. or more and at least one organic solvent having a boiling point of less than 150° C.

(10) The inkjet recording ink as described in (8) or (9) above, wherein at least one organic solvent having a boiling point of 150° C. or more is an alcohol derivative.

(11) The inkjet recording ink as described in (9) above, wherein at least one organic solvent having a boiling point of less than 150° C. is an alcohol derivative.

(12) The inkjet recording ink as described in any one of (1) to (11) above, which comprises at least one organic solvent not containing a heteroatom other than an oxygen atom.

(13) The inkjet recording ink as described in any one of (1) to (12) above, wherein a water-miscible organic solvent in which the dye has a solubility of 10 (g/100 g-solvent) or more at 25° C. is contained in an amount of 10 mass % or less based on the ink composition.

(14) An inkjet recording ink comprising an aqueous medium having dissolved and/or dispersed therein at least one dye having λmax in the region from 390 to 470 nm and represented by the following formula (1):

A—N═N—B                Formula (1):

wherein A and B each independently represents a heterocyclic group which may be substituted.

(15) The inkjet recording ink as described in (14) above, wherein the enforced discoloration rate constant of the ink for an ozone gas determined in the region of an image printed with the ink on a reflective image-receiving medium is $5.0 \times 10^{-2}$ [hour$^{-1}$] or less.

(16) The inkjet recording ink as described in (14) or (15) above, wherein the ratio of the absorbance I(λmax+70 nm) at λmax+70 nm to the absorbance I(λmax) at λmax, namely, I(λmax+70 nm)/I(λmax), is 0.4 or less.

(17) The inkjet recording ink as described in (16) above, wherein the ratio of the absorbance I(λmax+70 nm) at λmax+70 nm to the absorbance I(λmax) at λmax, namely, I(λmax+70 nm)/I(λmax), is 0.2 or less.

(18) The yellow ink for inkjet recording as described in any one of (14) to (17) above, wherein the oxidation potential of the dye is nobler than 1.0 V (vs SCE).

(19) The inkjet recording ink as described in any one of (14) to (18) above, which comprises at least one compound represented by the following formula (A):

Formula (A):

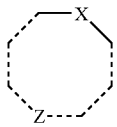

wherein X represents a carbonyl- or heteroatom-containing group and Z represents an atomic group capable of constituting a cyclic organic material.

(20) The inkjet recording ink as described in any one of (14) to (19) above, which comprises at least one compound represented by the following formula (B):

 X-Y-Z 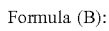 Formula (B):

wherein X represents a group represented by —N($Q_1$)-$Q_2$, Z represents a group represented by —N($Q_1$)-$Q_2$ or —O-$Q_3$, Y represents a group represented by —W-(G)$_k$—(H)$_n$—, W and H each represents a group represented by —CO—, —$SO_2$— or —PO($Q_4$)-, G represents a divalent linking group, $Q_1$ to $Q_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group, X and Z may combine with each other to form a ring, and k and n each represents 0 or 1.

(21) The inkjet recording ink as described in any one of (14) to (20) above, which comprises at least one antiseptic.

(22) The inkjet recording ink as described in (21) above, which comprises two or more different antiseptics.

(23) The inkjet recording ink as described in any one of (14) to (21) above, which comprises an organic solvent having a boiling point of 150° C. or more.

(24) The inkjet recording ink as described in any one of (14) to (23) above, which comprises at least one organic solvent having a boiling point of 150° C. or more and at least one organic solvent having a boiling point of less than 150° C.

(25) The inkjet recording ink as described in (23) or (24) above, wherein at least one organic solvent having a boiling point of 150° C. or more is an alcohol derivative.

(26) The inkjet recording ink as described in (24) above, wherein at least one organic solvent having a boiling point of less than 150° C. is an alcohol derivative.

(27) The inkjet recording ink as described in any one of (14) to (26) above, which comprises at least one organic solvent not containing a heteroatom other than an oxygen atom.

(28) The inkjet recording ink as described in any one of (14) to (27) above, wherein a water-miscible organic solvent in which the dye has a solubility of 10 (g/100 g-solvent) or more at 25° C. is contained in an amount of 10 mass % or less based on the ink composition.

(29) An inkjet recording method comprising using the inkjet recording ink described in any one of (1) to (28) above.

(30) An inkjet recording method comprising ejecting ink droplets according to recording signals on an image-receiving material to record an image on the image-receiving material, the image-receiving material comprising a support having thereon an image-receiving layer containing an inorganic white pigment particle, wherein the ink droplet comprises the inkjet recording ink described in any one of (1) to (28) above.

That is, the dye for use in the inkjet recording ink of the present invention is a dye having spectral absorption characteristics such that λmax is in the region from 390 to 470 nm and the ratio of the absorbance I(λmax+70 nm) at λmax+70 nm to the absorbance I(λmax) at λmax, namely, I(λmax+70 nm)/I(λmax), is 0.4 or more. The dye having such an absorption maximum wavelength and an absorption long-wave end can give a yellow color with high brightness and high density and since this dye undergoes no disadvantageous aggregation, stable ejection is also attained. Moreover, the dye for use in the present invention is a dye having, in addition to the above-described spectral absorption characteristics, excellent oxidation resistance such that the enforced discoloration rate constant as specified above is $5.0 \times 10^{-2}$ [hour$^{-1}$] or less. Accordingly, this is a dye satisfied in both ejection stability and fastness, which is an object of the present invention, and also excellent in the color hue as yellow.

Dyes having such spectral absorption characteristics and fastness to ozone at the same time can be used in the present invention, but among these dyes, the compound represented by formula (1) is particularly effective in view of the objects of the present invention.

Also, when the compound of formula (A) is added to the inkjet recording ink of the present invention, the ejection stability at the image drawing is more enhanced, and when the compound of formula (B) is added, the color bleeding is reduced.

It has been found that the prevention of color bleeding is greatly dependent on the composition for the aqueous medium of the ink. In the present invention, as described above, a water-miscible solvent (particularly, a water-miscible high boiling point solvent) is allowed to exist, a low boiling point solvent (particularly, a water-miscible low boiling point solvent) is used in combination, and the amount of a water-miscible solvent in which the dye has a high solubility is set to be low, whereby the color bleeding can be more reduced.

Furthermore, the physical properties of the ink solution can be stably maintained by using an antiseptic (antifungal) in the ink and in turn the ejection can be prevented from becoming unstable. Particularly, when two or more antifungals are used in combination, putrefying bacteria can hardly gain resistance and the ejection stability can be exerted for a longer period of time.

The inkjet recording ink of the present invention is used as the yellow ink but its use is not limited thereto and the ink may be used as a constituent dye also in a dark yellow ink or a black ink. However, the effect of the present invention can be remarkably exerted when used as a yellow ink. Therefore, in the following, application to an yellow ink is mainly described, but the present invention is not limited thereto.

BEST MODE FOR CARRYING OUT THE INVENTION

Specific embodiments of the present invention are described in detail below.

In the description of the present invention, the "dye" is used in a wide sense and unless any question arises, this indicates collectively a water-soluble dye (dye in a narrow sense) and a pigment dispersible in an aqueous medium.

The present invention is described in detail below.

In the present invention, the "image-receiving medium" such as recording paper or film is sometimes referred to as "media" according to usage in this industry. Also, the "spectral region of blue light" subjected to the measurement of density with Status A blue filter light is sometimes referred to as "yellow region" because the objective of measurement is yellow.

The yellow dye for use in the present invention is, as described above or described in greater detail later, characterized by having a specific blue spectral absorption region, a waveform short-tailed at the absorption long-wave end, and excellent oxidation resistance.

As for the oxidation resistance, the fastness to an ozone gas of the ink using this dye is $5.0 \times 10^{-2}$ [hour$^{-1}$] or less when expressed by a reinforced discoloration rate constant as a measure.

In the present invention, the enforced discoloration rate constant of the ink is a rate constant determined by the following method. An image is printed on a reflective image-receiving medium by using only the ink to be measured out of the ink set, the color of the obtained image in the main spectral absorption region of the ink is measured through a Status A filter, the colored region having a reflection density of 0.90 to 1.10 is selected as the initial density point, the image is discolored by an ozone discoloration tester capable of constantly maintaining an ozone concentration of 5 mg/L, the time until the density decreases to 80% of the initial density is measured by using the initial density as the starting density (=100%), and on the assumption that the relationship between the residual dye and the time follows the first-order reaction rate equation (the relationship between the discoloration density and the time follows the linear expression), the discoloration rate constant is determined from the time spent to reach 80%. Accordingly, the determined discoloration rate constant is a discoloration rate constant in the colored region of the image printed with the ink, but in the present invention, this value is used as the discoloration rate constant of the ink.

The yellow dye is preferably a dye having an oxidation potential nobler than 1.0 V (vs SCE), more preferably nobler than 1.1 V vs SCE, still more preferably nobler than 1.2 V vs SCE. As for the kind of dye, azo dyes satisfying the above-described requirements are particularly preferred.

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Method*), Gihodo Shuppan Sha (1984).

More specifically, a test sample is dissolved to a concentration of $1 \times 10^{-4}$ to $1 \times 10^{-6}$ mol/liter in a solvent such as dimethylformamide or acetonitrile containing a supporting electrolyte such as sodium perchlorate or tetrapropylammonium perchlorate and the oxidation potential is measured as a value to SCE (saturated calomel electrode) by using a cyclic voltammetry or a direct current polarography. This value sometimes deviates on the order of tens of millivolt due to the effect of liquid junction potential, liquid resistance of sample solution, or the like, but the reproducibility of potential can be guaranteed by adding a standard sample (for example, hydroquinone).

In order to univocally specify the potential, in the present invention, the value (vs SCE) measured by a direct current polarography in a dimethylformamide (concentration of dye: 0.001 mol dm$^{-3}$) containing 0.1 mol dm$^{-3}$ of tetrapropylammonium perchlorate as the supporting electrolyte is used as the oxidation potential of the dye.

The Eox value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler when an electron-withdrawing group is introduced, and becomes baser when an electron-donating group is introduced. In the present invention, the oxidation potential is preferably rendered nobler by introducing an electron-withdrawing group into the yellow dye skeleton so as to reduce the reactivity with ozone which is an electrophilic agent.

The dye for use in the present invention preferably has good fastness and also has good color hue, particularly, no tailing on the long-wave side in the absorption spectrum. For this purpose, λmax is in the range from 390 to 470 nm and as for the characteristics of the absorption long-wave end, the ratio I(λmax+70 nm)/I(λmax) of the absorbance I(λmax+70 nm) at λmax+70 nm to the absorbance I(λmax) at λmax is 0.4 or less, preferably 0.3 or less, more preferably 0.2 or less, still more preferably 0.15 or less.

For the ink of the present invention, a dye satisfying such oxidation potential and absorption characteristics is used.

Also, in the present invention, a dye having a maximum absorbance (λmax) in the range from 390 to 470 nm, represented by the following formula (I), is preferred.

     Formula (1):

wherein A and B each independently represents a heterocyclic group which may be substituted.

The heterocyclic ring constituting the heterocyclic group is preferably a heterocyclic ring belonging to the 5- or 6-membered ring and may have a monocyclic structure or a polycyclic structure resulting from condensation of two or more rings or may be an aromatic ring or a non-aromatic ring. The heteroatom constituting the heterocyclic ring is preferably an N, O or S atom.

In formula (1), the heterocyclic ring constituting A is preferably 5-pyrazolone, pyrazole, triazole, oxazolone, isoxazolone, barbituric acid, pyridone, pyridine, rhodanine, pyrazolidinedione, pyrazolopyridone, merdramic acid or a condensed heterocyclic ring where such a heterocyclic ring is further condensed with a hydrocarbon aromatic ring or a heterocyclic ring. Among these, preferred are 5-pyrazolone, 5-aminopyrazole, pyridone, 2,6-diaminopyridine and pyrazoloazoles, and more preferred are 5-aminopyrazole, 2-hydroxy-6-pyridone and pyrazolotriazole.

Examples of the heterocyclic ring constituting B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzisothiazole, thiadiazole, benzisoxazole, pyrrolidine, piperidine, piperazine, imidazolidine and thiazoline. Among these, preferred are pyridine, quinoline, thiophene, benzothiophene, pyrazole, imidazole, benzimidazole, triazole, oxazole, isoxazole, benzoxazole, thiazole, benzothiazole, isothiazole, benzisothiazole, thiadiazole and benzisoxazole, more preferred are quinoline, thiophene, pyrazole, thiazole, benzoxazole, benzisoxazole, isothiazole, imidazole, benzothiazole and thiadiazole, and still more preferred are pyrazole, benzothiazole, benzoxazole, imidazole, 1,2,4-thiadiazole and 1,3,4-thiadiazole.

Examples of the substituent substituted to A and B include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imide group, a phosphino group, a phosphinyl group, a phosphinyloxy group, a phosphinylamino group, a silyl group and an ionic hydrophilic group.

In the case where the dye represented by formula (1) is used as a water-soluble dye, the dye preferably contains at least one ionic hydrophilic group within the molecule. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include an ammonium ion, alkali metal ions (e.g., lithium ion, sodium ion, potassium ion) and organic cations (e.g., tetramethylammonium ion, tetramethylguanidium ion, tetramethylphosphonium).

Among these counter ions, alkali metal salts are preferred. Among the dyes represented by formula (1), preferred are the dyes represented by the following formulae (2), (3) and (4):

Formula (2):

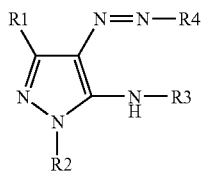

wherein R1 and R3 each represents a hydrogen atom, a cyano group, an alkyl group, a cycloalkyl group, an aralkyl group, an alkoxy group, an alkylthio group, an arylthio group, an aryl group or an ionic hydrophilic group, R2 represents a hydrogen atom, an alkyl group, a cycloalkyl group, an aralkyl group, a carbamoyl group, an acyl group, an aryl group or a heterocyclic group, and R4 represents a heterocyclic group;

Formula (3):

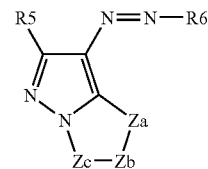

wherein R5 represents a hydrogen atom, a cyano group, an alkyl group, a cycloalkyl group, an aralkyl group, an alkoxy group, an alkylthio group, an arylthio group, an aryl group or an ionic hydrophilic group, Za represents —N=, —NH— or —C(R11)=, Zb and Zc each independently represents —N= or —C(R11)=, R11 represents a hydrogen atom or a nonmetallic substituent, and R6 represents a heterocyclic group;

Formula (4):

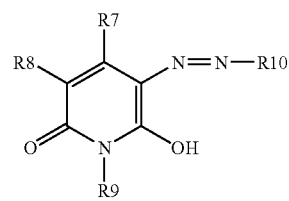

wherein R7 and R9 each independently represents a hydrogen atom, a cyano group, an alkyl group, a cycloalkyl group, an aralkyl group, an aryl group, an alkylthio group, an arylthio group, an alkoxycarbonyl group, a carbamoyl group or an ionic hydrophilic group, R8 represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, an alkylsulfonyl group, an arylsulfonyl group, an acyl group, an amino group, a hydroxy group or an ionic hydrophilic group, and R10 represents a heterocyclic group.

In formulae (2), (3) and (4), the alkyl group represented by R1, R2, R3, R5, R7, R8 an R9 includes an alkyl group having a substituent and an unsubstituted alkyl group. The alkyl group is preferably an alkyl group having from 1 to 20 carbon atoms. Examples of the substituent include a hydroxyl group, an alkoxy group, a cyano group, a halogen atom and an ionic hydrophilic group. Examples of the alkyl group include methyl, ethyl, butyl, isopropyl, tert-butyl, hydroxyethyl, methoxyethyl, cyanoethyl, trifluoromethyl, 3-sulfopropyl and 4-sulfobutyl.

The cycloalkyl group represented by R1, R2, R3, R5, R7, R8 and R9 includes a cycloalkyl group having a substituent and an unsubstituted cycloalkyl group. The cycloalkyl group is preferably a cycloalkyl group having from 5 to 12 carbon atoms. Examples of the substituent include an ionic hydrophilic group. Examples of the cycloalkyl group include a cyclohexyl group.

The aralkyl group represented by R1, R2, R3, R5, R7, R8 and R9 includes an aralkyl group having a substituent and an unsubstituted aralkyl group. The aralkyl group is preferably an aralkyl group having from 7 to 20 carbon atoms.

Examples of the substituent include an ionic hydrophilic group. Examples of the aralkyl group include benzyl and 2-phenethyl.

The aryl group represented by R1, R2, R3, R5, R7, R8 and R9 includes an aryl group having a substituent and an unsubstituted aryl group. The aryl group is preferably an aryl group having from 6 to 20 carbon atoms. Examples of the substituent include an alkyl group, an alkoxy group, a halogen atom, an alkylamino group and an ionic hydrophilic group. Examples of the aryl group include phenyl, p-tolyl, p-methoxyphenyl, o-chlorophenyl and m-(3-sulfopropylamino)phenyl.

The alkylthio group represented by R1, R2, R3, R5, R7, R8 and R9 includes an alkylthio group having a substituent and an unsubstituted alkylthio group. The alkylthio group is preferably an alkylthio group having from 1 to 20 carbon atoms. Examples of the substituent include an ionic hydrophilic group. Examples of the alkylthio group include methylthio and ethylthio.

The arylthio group represented by R1, R2, R3, R5, R7, R8 and R9 includes an arylthio group having a substituent and an unsubstituted arylthio group. The arylthio group is preferably an arylthio group having from 6 to 20 carbon atoms. Examples of the substituent include an alkyl group and an ionic hydrophilic group. Examples of the arylthio group include phenylthio and p-tolylthio.

The heterocyclic group represented by R2 (and $R^{22}$ which is described later) is preferably a 5- or 6-membered heterocyclic ring and the heterocyclic ring may be further condensed. The heteroatom constituting the heterocyclic ring is preferably N, S or O. The heterocyclic ring may be an aromatic heterocyclic ring or a non-aromatic heterocyclic ring. The heterocyclic ring may be substituted and examples of the substituent are the same as those of the substituent of the aryl group which is described later. The heterocyclic ring is preferably a 6-membered nitrogen-containing aromatic heterocyclic ring and preferred examples thereof include triazine, pyrimidine and phthalazine.

The halogen atom represented by R8 includes a fluorine atom, a chlorine atom and a bromine atom.

The alkoxy group represented by R1, R3, R5 and R8 includes an alkoxy group having a substituent and an unsubstituted alkoxy group. The alkoxy group is preferably an alkoxy group having from 1 to 20 carbon atoms. Examples of the substituent include a hydroxyl group and an ionic hydrophilic group. Examples of the alkoxy group include methoxy, ethoxy, isopropoxy, methoxyethoxy, hydroxyethoxy and 3-carboxypropoxy.

The aryloxy group represented by R8 includes an aryloxy group having a substituent and an unsubstituted aryloxy group. The aryloxy group is preferably an aryloxy group having from 6 to 20 carbon atoms. Examples of the substituent include an alkoxy group and an ionic hydrophilic group. Examples of the aryloxy group include phenoxy, p-methoxyphenoxy and o-methoxyphenoxy.

The acylamino group represented by R8 includes an acylamino group having a substituent and an unsubstituted acylamino group. The acylamino group is preferably an acylamino group having from 2 to 20 carbon atoms. Examples of the substituent include an ionic hydrophilic group. Examples of the acylamino group include acetamide, propionamide, benzamide and 3,5-disulfobenzamide.

The sulfonylamino group represented by R8 includes a sulfonylamino group having a substituent and an unsubstituted sulfonylamino group. The sulfonylamino group is preferably a sulfonylamino group having from 1 to 20 carbon atoms. Examples of the sulfonylamino group include methylsulfonylamino and ethylsulfonylamino.

The alkoxycarbonylamino group represented by R8 includes an alkoxycarbonylamino group having a substituent and an unsubstituted alkoxycarbonylamino group. The alkoxycarbonylamino group is preferably an alkoxycarbonylamino group having from 2 to 20 carbon atoms. Examples of the substituent include an ionic hydrophilic group. Examples of the alkoxycarbonylamino group include ethoxycarbonylamino.

The ureido group represented by R8 includes a ureido group having a substituent and an unsubstituted ureido group. The ureido group is preferably a ureido group having from 1 to 20 carbon atoms. Examples of the substituent include an alkyl group and an aryl group. Examples of the ureido group include 3-methylureido, 3,3-dimethylureido and 3-phenylureido.

The alkoxycarbonyl group represented by R7, R8 and R9 includes an alkoxycarbonyl group having a substituent and an unsubstituted alkoxycarbonyl group. The alkoxycarbonyl group is preferably an alkoxycarbonyl group having from 2 to 20 carbon atoms. Examples of the substituent include an ionic hydrophilic group. Examples of the alkoxycarbonyl group include methoxycarbonyl and ethoxycarbonyl.

The carbamoyl group represented by R2, R7, R8 and R9 includes a carbamoyl group having a substituent and an unsubstituted carbamoyl group. Examples of the substituent include an alkyl group. Examples of the carbamoyl group include a methylcarbamoyl group and a dimethylcarbamoyl group.

The sulfamoyl group represented by R8 includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Examples of the alkylsulfonyl group and arylsulfonyl group represented by R8 include methylsulfonyl and phenylsulfonyl.

The acyl group represented by R2 and R8 includes an acyl group having a substituent and an unsubstituted acyl group. The acyl group is preferably an acyl group having from 1 to 20 carbon atoms. Examples of the substituent include an ionic hydrophilic group. Examples of the acyl group include acetyl and benzoyl.

The amino group represented by R8 includes an amino group having a substituent and an unsubstituted amino group. Examples of the substituent include an alkyl group, an aryl group and a heterocyclic group. Examples of the amino group include methylamino, diethylamino, anilino and 2-chloroanilino.

The heterocyclic group represented by R4, R6 and R10 is the same as the heterocyclic group represented by B in formula (1), which may be substituted, and preferred examples, more preferred examples and still more preferred examples are the same as those described above. Examples of the substituent include an ionic hydrophilic group, an alkyl group having from 1 to 12 carbon atoms, an aryl group, an alkylthio group, an arylthio group, a halogen atom, a cyano group, a sulfamoyl group, a sulfonamino group, a carbamoyl group and an acylamino group. The alkyl group, the aryl group and the like each may further have a substituent.

In formula (3), Za represents —N═, —NH— or —C(R11)═, Zb and Zc each independently represents —N═ or —C(R11)═, and R11 represents a hydrogen atom or a nonmetallic substituent. The nonmetallic substituent represented by R11 is preferably a cyano group, a cycloalkyl group, an aralkyl group, an aryl group, an alkylthio group, an arylthio group or an ionic hydrophilic group. These substituents have the same meanings as the substituents represented by R1, respectively, and preferred examples are also the same. Examples of the skeleton of the heterocyclic ring comprising two 5-membered rings, contained in formula (3), are shown below.

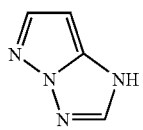 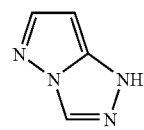 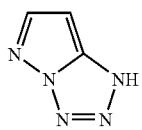

When the above-described substituents each may further have a substituent, examples of the substituent include the substituents which may be substituted to the heterocyclic rings A and B in formula (1).

In the case where the dyes represented by formulae (2) to (4) are used as a water-soluble dye, the dye preferably contains at least one ionic hydrophilic group within the molecule. This dye includes dyes where at least one of R1, R2, R3, R5, R7, R8 and R9 in formulae (2) to (4) is an ionic hydrophilic group, and dyes where R1 to R11 in formulae (2) to (4) each further has an ionic hydrophilic group as a substituent. Examples of the ionic hydrophilic group include the same groups as those belonging to the ionic hydrophilic group described above for the substituent of formula (1).

Among the dyes represented by formulae (2), (3) and (4), preferred is the dye represented by formula (2), and more preferred is a dye represented by the following formula (2-1):

Formula (2-1):

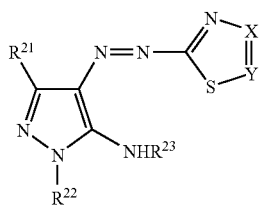

wherein $R^{21}$ and $R^{23}$ each represents a hydrogen atom, an alkyl group, a cycloalkyl group, an aralkyl group, an alkoxy group or an aryl group, $R^{22}$ represents an aryl group or a heterocyclic group, one of X and Y represents a nitrogen atom and another represents —$CR^{24}$ (wherein $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group or an acylamino group). These substituents each may be further substituted.

Specific examples of preferred dyes for use in the present invention are set forth below, but the dye for use in the present invention is not limited to the following specific examples. These compounds can be synthesized by referring to JP-A-2-24191, JP-A-2001-279145 and Japanese Patent Application No. 2000-124832.

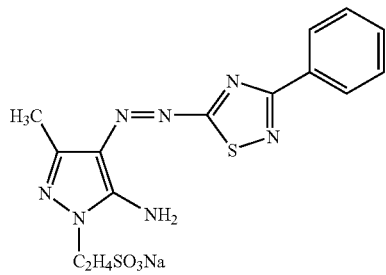

I-1

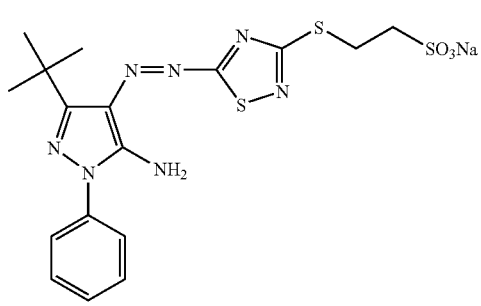

I-2

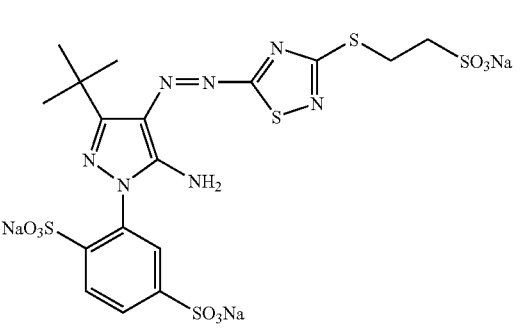

I-3

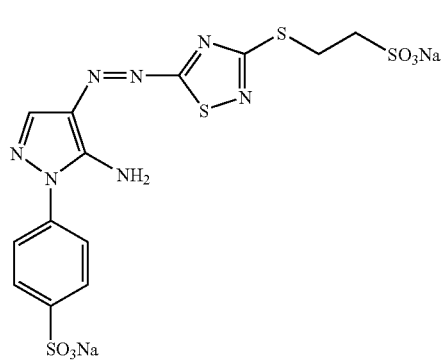

I-4

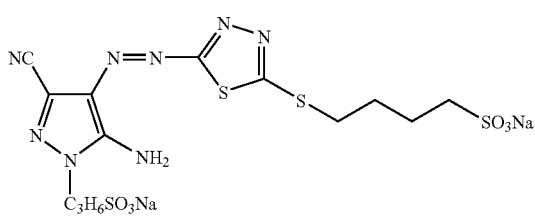

I-5

-continued
I-6
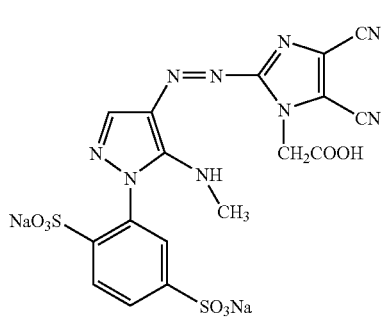
I-7
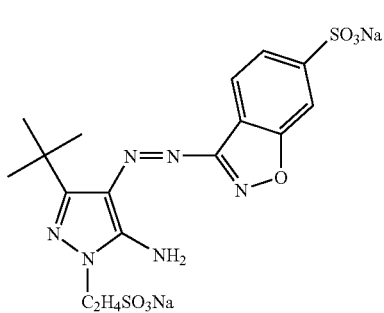
I-8
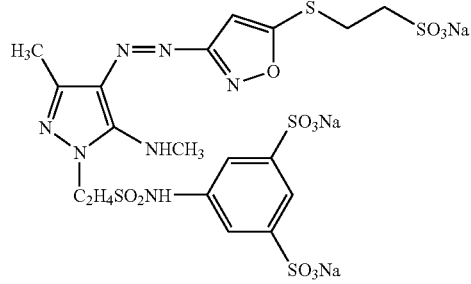
I-9
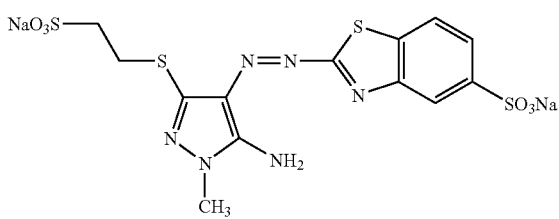
I-10
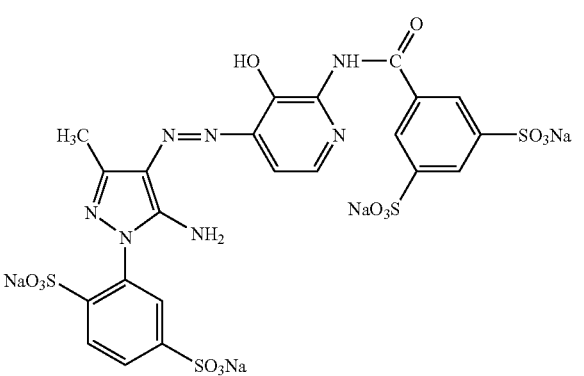
-continued
I-11
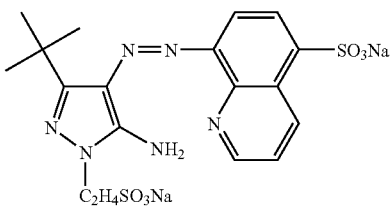
I-12
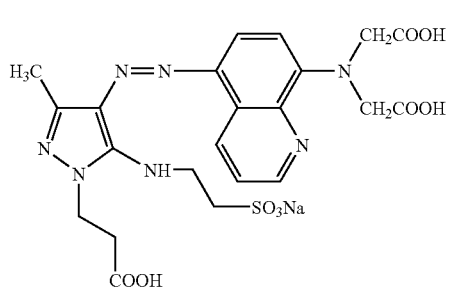
I-13
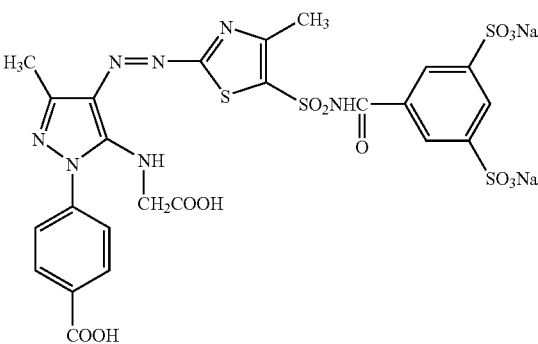
I-14
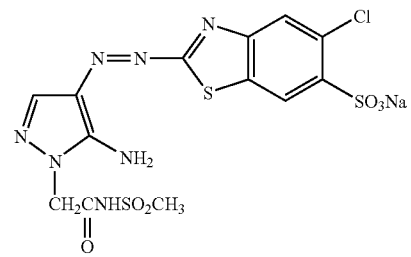
I-15
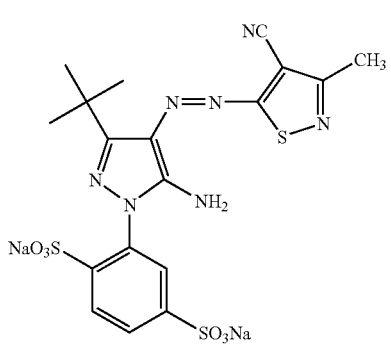

| Dye | R |
|---|---|
| I-18 | CH₃ |
| I-19 | C₃H₆SO₃Na |
| I-20 | H |
| I-21 | C₂H₄CN |
| I-22 | -C₆H₄-SO₃Na (para) |
| I-23 | 2-Cl, 5-methyl, 3-SO₃Na phenyl |
| I-24 | 2,5-dichloro-4-SO₃Na phenyl |
| I-25 | 4-COOK phenyl |
| I-26 | 3,5-di(COONa) phenyl |
| I-27 | 3,5-di(SO₃Na) phenyl |

| Dye | R |
|---|---|
| I-28 | CH₃ |
| I-29 | C₆H₅ |
| I-30 | OC₂H₅ |

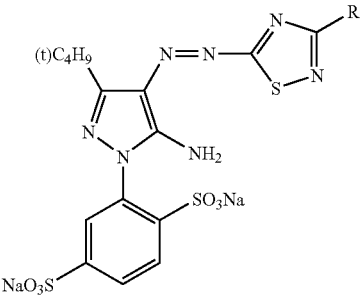
| Dye | R |
|---|---|
| I-31 | 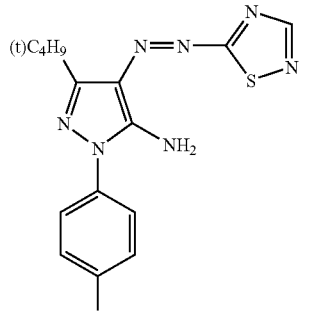 |
| I-32 | CH$_3$ |
| I-33 | SC$_2$H$_4$SO$_3$Na |
| I-34 | SO$_2$C$_2$H$_4$SO$_3$Na |
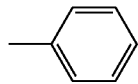
| Dye | R |
|---|---|
| I-35 | H |
| I-36 | CH$_3$ |
| I-37 |  |
| Dye | R |
|---|---|
| I-38 | COOC$_4$H$_9$ |
| I-39 | CON(C$_4$H$_9$)$_2$ |
| I-40 | SO$_2$NHC$_{12}$H$_{25}$ |
| I-41 | OC$_8$H$_{17}$ |
| Dye | R | R' |
|---|---|---|
| I-42 | CON(C$_4$H$_9$)$_2$ | H |
| I-43 | COOC$_8$H$_{17}$ | H |
| I-44 | CON(C$_4$H$_9$)$_2$ |  |
| I-45 | CON(C$_4$H$_9$)$_2$ | CH$_3$ |
| I-46 | H |  |
| I-47 | H | SC$_8$H$_{17}$ |

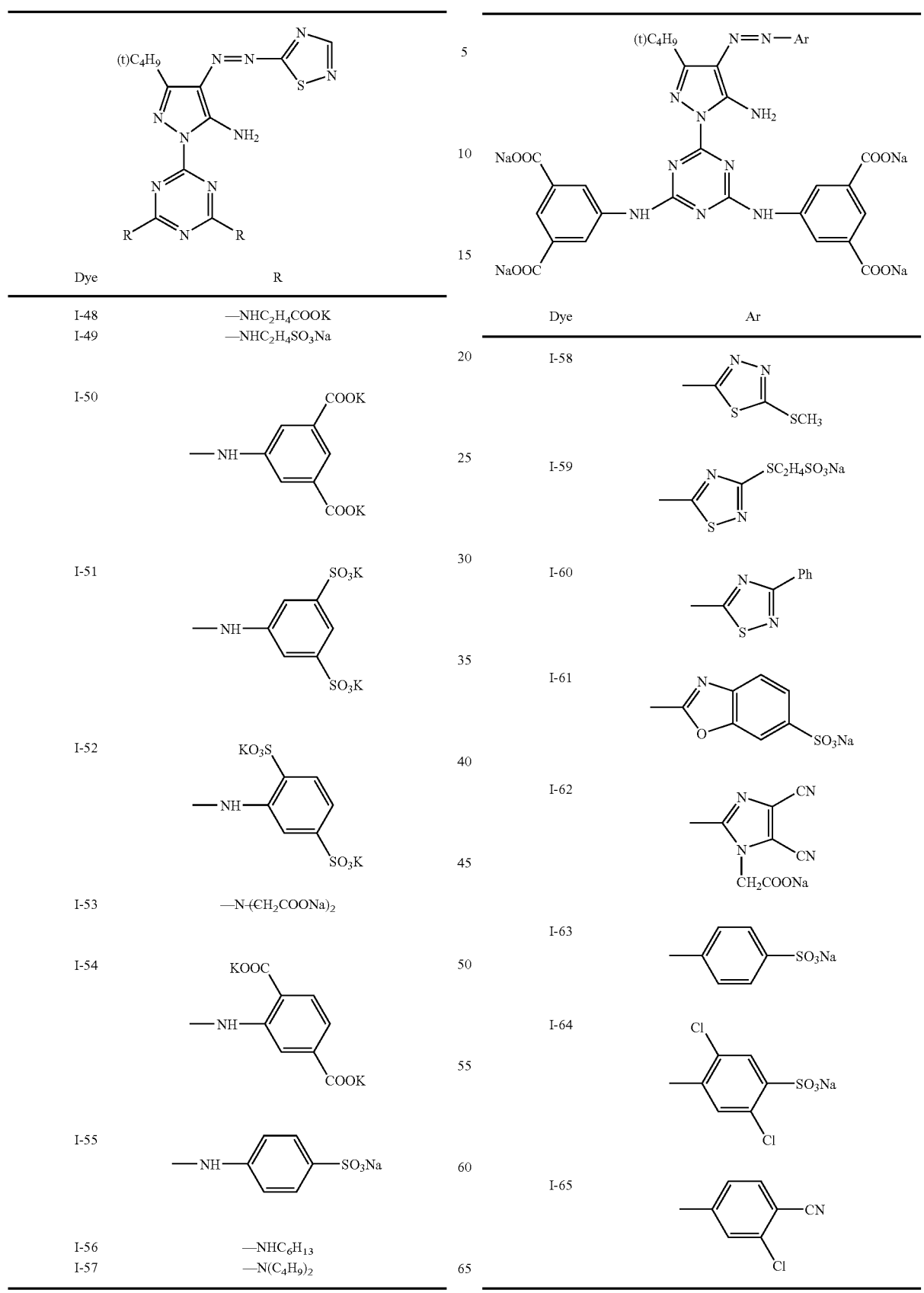

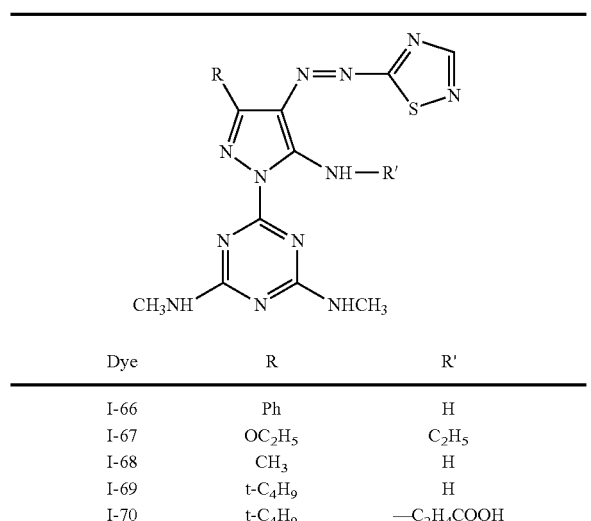
| Dye | R | R' |
|---|---|---|
| I-66 | Ph | H |
| I-67 | OC$_2$H$_5$ | C$_2$H$_5$ |
| I-68 | CH$_3$ | H |
| I-69 | t-C$_4$H$_9$ | H |
| I-70 | t-C$_4$H$_9$ | —C$_2$H$_4$COOH |
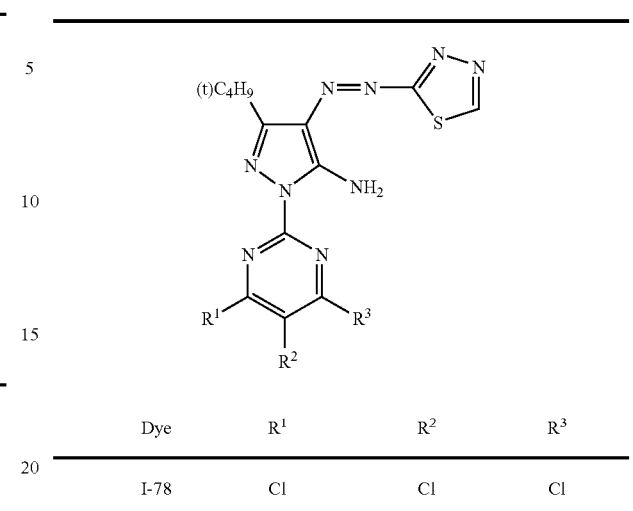
| Dye | R$^1$ | R$^2$ | R$^3$ |
|---|---|---|---|
| I-78 | Cl | Cl | Cl |
| I-79 | Cl | Cl | F |
| I-80 | Cl | —CONHPh | Cl |
Dye I-71
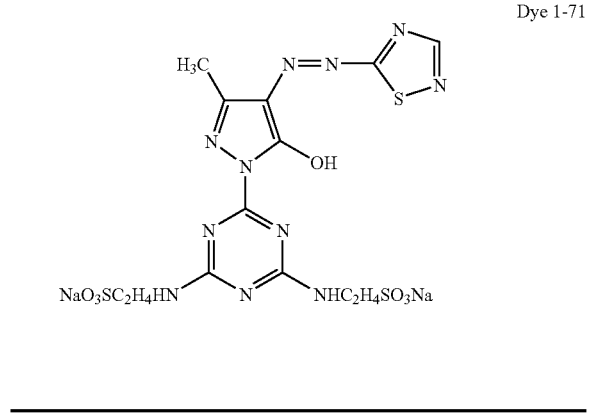
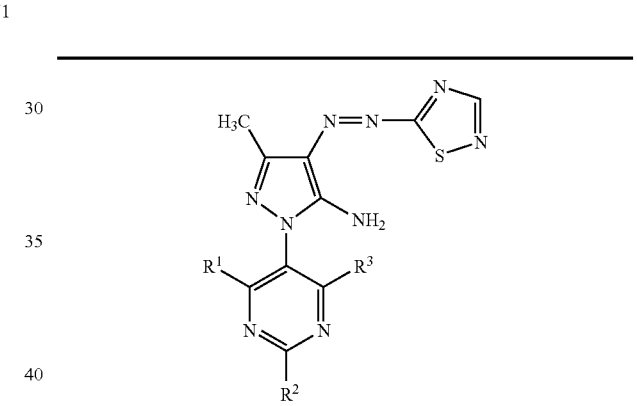
| Dye | R$^1$ | R$^2$ | R$^3$ |
|---|---|---|---|
| I-81 | F | H | H |
| I-82 | Cl | H | F |
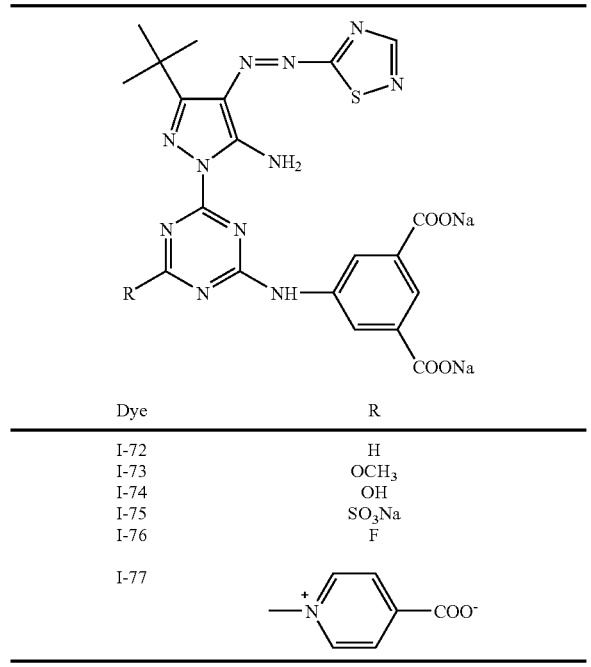
| Dye | R |
|---|---|
| I-72 | H |
| I-73 | OCH$_3$ |
| I-74 | OH |
| I-75 | SO$_3$Na |
| I-76 | F |
| I-77 | ![pyridinium] |
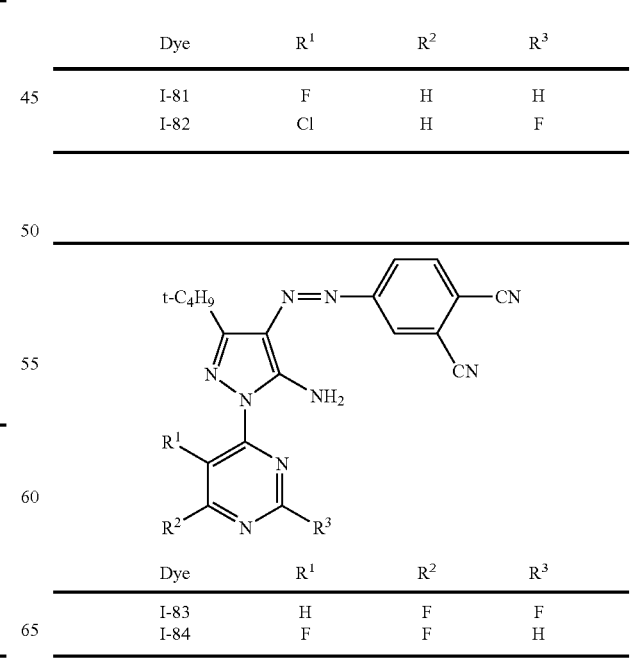
| Dye | R$^1$ | R$^2$ | R$^3$ |
|---|---|---|---|
| I-83 | H | F | F |
| I-84 | F | F | H |

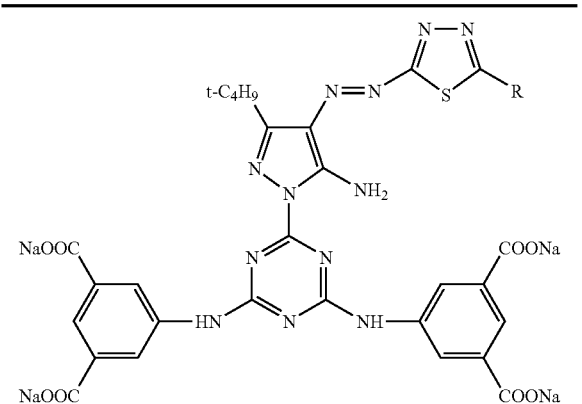

| Dye | R |
|---|---|
| I-85 | H |
| I-86 | $CH_3$ |
| I-87 | Ph |
| I-88 | $SCH_2COONa$ |
| I-89 | $SC_2H_5$ |
| I-90 | $SC_4H_9$-n |
| I-91 | $SCH_2CHMe_2$ |
| I-92 | SCHMeEt |
| I-93 | $SC_4H_9$-t |
| I-94 | $SC_7H_{15}$-n |
| I-95 | $SC_2H_4OC_2H_5$ |
| I-96 | $SC_2H_4OC_4H_9$-n |
| I-97 | $SCH_2CF_3$ |

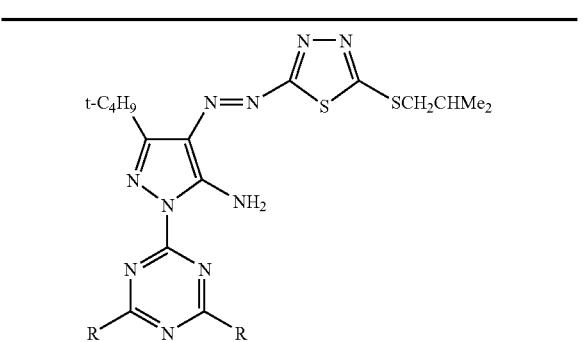

| Dye | R |
|---|---|
| I-98 | $—NHC_2H_4COOK$ |
| I-99 | $—NHC_2H_4SO_3Na$ |

I-100 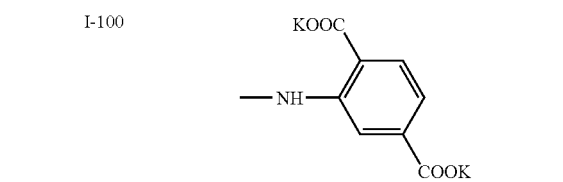

I-101 

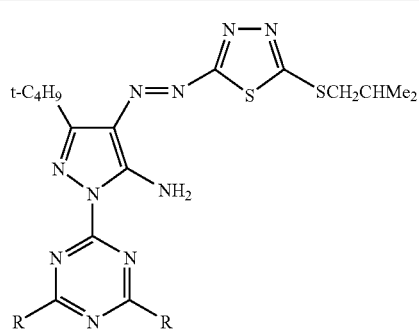

| Dye | R |
|---|---|
| I-102 |  |
| I-103 | 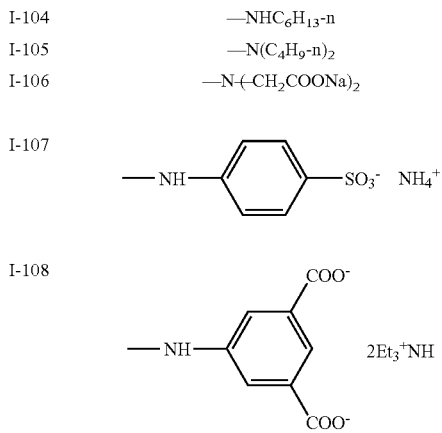 |
| I-104 | $—NHC_6H_{13}$-n |
| I-105 | $—N(C_4H_9\text{-}n)_2$ |
| I-106 | $—N(—CH_2COONa)_2$ |
| I-107 | —NH—C$_6$H$_4$—SO$_3^-$ NH$_4^+$ |
| I-108 | (see structure) |

The inkjet recording ink of the present invention preferably contains this yellow dye in an amount of 0.2 to 20 mass %, more preferably from 0.5 to 15 mass %.

Also in the case of using the yellow dye for a dark yellow ink, a black ink or the like, the content of the yellow dye is set such that the ink provides an appropriate color hue and the sum of contents of all dyes in the ink falls within the above-described range.

The ink of the present invention preferably further contains a compound represented by formula (A). In formula (A), X represents a carbonyl- or heteroatom-containing group.

Formula (A):

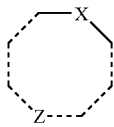

Examples of X include a carbonyl group, an oxycarbonyl group, a carbonic ester group, an amido group, a urethane group, a ureido group, an amino group, an imino group, an ether bond-type oxygen atom, a thioether bond-type sulfur atom, a phosphoric acid derivative group, a phosphonic acid derivative group, a sulfonyl group, a sulfonamido group and a sulfonylurea group, with an amido group being preferred.

Z represents an atomic group capable of constituting a cyclic organic material. Z may be a ring constituted only by a carbon atom or may further contain a heteroatom in the ring of carbon atoms. Also, the ring may or may not have aromaticity. Furthermore, a compound where multiple rings are condensed may be formed.

The compound represented by formula (A) may have various substituents in the structure thereof. Examples of the substituent include an alkyl group (preferably having from 1 to 20 carbon atoms, more preferably from 1 to 12 carbon atoms, still more preferably from 1 to 8 carbon atoms, e.g., methyl, ethyl, iso-propyl, tert-butyl, n-octyl, n-decyl, n-hexadecyl, cyclopropyl, cyclopentyl, cyclohexyl), an alkenyl group (preferably having from 2 to 20 carbon atoms, more preferably from 2 to 12 carbon atoms, still more preferably from 2 to 8 carbon atoms, e.g., vinyl, allyl, 2-butenyl, 3-pentenyl), an alkynyl group (preferably having from 2 to 20 carbon atoms, more preferably from 2 to 12 carbon atoms, still more preferably from 2 to 8 carbon atoms, e.g., propargyl, 3-pentynyl), an aryl group (preferably having from 6 to 30 carbon atoms, more preferably from 6 to 20 carbon atoms, still more preferably from 6 to 12 carbon atoms, e.g., phenyl, p-methylphenyl, naphthyl), an amino group (preferably having from 0 to 20 carbon atoms, more preferably from 0 to 12 carbon atoms, still more preferably from 0 to 6 carbon atoms, e.g., amino, methylamino, dimethylamino, diethylamino, diphenylamino, dibenzylamino), an alkoxy group (preferably having from 1 to 20 carbon atoms, more preferably from 1 to 12 carbon atoms, still more preferably from 1 to 8 carbon atoms, e.g., methoxy, ethoxy, butoxy), an aryloxy group (preferably having from 6 to 20 carbon atoms, more preferably from 6 to 16 carbon atoms, still more preferably from 6 to 12 carbon atoms, e.g., phenyloxy, 2-naphthyloxy), an acyl group (preferably having from 1 to 20 carbon atoms, more preferably from 1 to 16 carbon atoms, still more preferably from 1 to 12 carbon atoms, e.g., acetyl, benzoyl, formyl, pivaloyl), an alkoxycarbonyl group (preferably having from 2 to 20 carbon atoms, more preferably from 2 to 16 carbon atoms, still more preferably from 2 to 12 carbon atoms, e.g., methoxycarbonyl, ethoxycarbonyl), an aryloxycarbonyl group (preferably having from 7 to 20 carbon atoms, more preferably from 7 to 16 carbon atoms, still more preferably from 7 to 10 carbon atoms, e.g., phenyloxycarbonyl), an acyloxy group (preferably having from 2 to 20 carbon atoms, more preferably from 2 to 16 carbon atoms, still more preferably from 2 to 10 carbon atoms, e.g., acetoxy, benzoyloxy), an acylamino group (preferably having from 2 to 20 carbon atoms, more preferably from 2 to 16 carbon atoms, still more preferably from 2 to 10 carbon atoms, e.g., acetylamino, benzoylamino), an alkoxycarbonylamino group (preferably having from 2 to 20 carbon atoms, more preferably from 2 to 16 carbon atoms, still more preferably from 2 to 12 carbon atoms, e.g., methoxycarbonylamino), an aryloxycarbonylamino group (preferably having from 7 to 20 carbon atoms, more preferably from 7 to 16 carbon atoms, still more preferably from 7 to 12 carbon atoms, e.g., phenyloxycarbonylamino), a sulfonylamino group (preferably having from 1 to 20 carbon atoms, more preferably from 1 to 16 carbon atoms, still more preferably from 1 to 12 carbon atoms, e.g., methylsulfonylamino, phenylsulfonylamino), a sulfamoyl group (preferably having from 0 to 20 carbon atoms, more preferably from 0 to 16 carbon atoms, still more preferably from 0 to 12 carbon atoms, e.g., sulfamoyl, methylsulfamoyl, dimethylsulfamoyl, phenylsulfamoyl), a carbamoyl group (preferably having from 1 to 20 carbon atoms, more preferably from 1 to 16 carbon atoms, still more preferably from 1 to 12 carbon atoms, e.g., carbamoyl, methylcarbamoyl, diethylcarbamoyl, phenylcarbamoyl), an alkylthio group (preferably having from 1 to 20 carbon atoms, more preferably from 1 to 16 carbon atoms, still more preferably from 1 to 12 carbon atoms, e.g., methylthio, ethylthio), an arylthio group (preferably having from 6 to 20 carbon atoms, more preferably from 6 to 16 carbon atoms, still more preferably from 6 to 12 carbon atoms, e.g., phenylthio), a sulfonyl group (preferably having from 1 to 20 carbon atoms, more preferably from 1 to 16 carbon atoms, still more preferably from 1 to 12 carbon atoms, e.g., mesyl, tosyl), a sulfinyl group (preferably having from 1 to 20 carbon atoms, more preferably from 1 to 16 carbon atoms, still more preferably from 1 to 12 carbon atoms, e.g., methylsulfinyl, phenylsulfinyl), a ureido group (preferably having from 1 to 20 carbon atoms, more preferably from 1 to 16 carbon atoms, still more preferably from 1 to 12 carbon atoms, e.g., ureido, methylureido, phenylureido), a phosphoric acid amide group (preferably having from 1 to 20 carbon atoms, more preferably from 1 to 16 carbon atoms, still more preferably from 1 to 12 carbon atoms, e.g., diethylphosphoric acid amide, phenylphosphoric acid amide), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having from 1 to 30 carbon atoms, more preferably from 1 to 12 carbon atoms, and containing a heteroatom such as nitrogen atom, oxygen atom or sulfur atom; specific examples include imidazolyl, pyridyl, quinolyl, furyl, thienyl, piperidyl, morpholino, benzoxazolyl, benzimidazolyl, benzothiazolyl, carbazolyl and azepinyl), and a silyl group (preferably having from 3 to 40 carbon atoms, more preferably from 3 to 30 carbon atoms, still more preferably from 3 to 24 carbon atoms, e.g., trimethylsilyl, triphenylsilyl). These substituents each may be further substituted. When two or more substituents are present, these may be the same or different. If possible, these substituents may combine with each other to form a ring.

The compound represented by formula (A) is preferably a compound having a monocyclic structure and being liquid under the conditions of normal temperature and normal pressure. Also, the compound may have various structures such as oil-soluble structure or water-soluble structure but is preferably a water-soluble compound.

Examples of the compound which is preferably used as the compound represented by formula (A) include cyclohexanone, cyclopentanone, ethylene carbonate, γ-butyrolactone, propylene carbonate, 2-pyrrolidone, ε-caprolactam, tetrahydrofuran, 1,4-dioxane, 1,3-dimethylimidazolidinone, N-methylpyrrolidone, ethyleneurea, sulfolane, pyridine, pyrazine, morpholine, 1-methyl-2-pyridone, 2-methyl-2-oxazoline, 2-ethyl-2-oxazoline and 2,4,4-trimethyl-2-oxazoline, but the present invention is of course not limited thereto.

The compound represented by formula (A) can be used in an amount over a wide range but the amount added thereof is preferably from 0.001 to 50 mass %, more preferably from 0.1 to 10 mass %.

The compound represented by formula (A) contributes to ejection stability of the ink of the present invention and prevention of color bleeding of the image drawn, but some compounds additionally have the same function as those of other functional components described in the present invention and are included in the description of such functional components.

It is also preferred that the ink of the present invention further contains a compound represented by formula (B).

X-Y-Z    Formula (B):

wherein X represents a group represented by —N($Q_1$)-$Q_2$, Z represents a group represented by —N($Q_1$)-$Q_2$ or —O-$Q_3$, Y represents a group represented by —W-(G)$_k$—(H)$_n$—.

Here, W and H each represents a group represented by —CO—, —SO$_2$— or —PO($Q_4$)-, preferably a carbonyl group or a sulfonyl group.

G represents a divalent linking group. Preferred examples of the divalent linking group include an alkylene group, an alkenylene group, an alkynylene group, an arylene group, an ether bond-type oxygen atom, an imino group, an alkylimino group, a thioether bond-type sulfur atom, and a group represented by —V— (wherein V represents a heterocyclic ring).

The alkylene group represented by G is preferably an alkylene group having from 1 to 20 carbon atoms, such as methylene group, ethylene group, 1,3-propylene group, 1,2-propylene group, 1,4-butylene group, 1,6-hexylene group and 1,8-octylene group.

The alkenylene group is preferably an alkenylene group having from 1 to 20 carbon atoms, such as a vinylene group.

The arylene group is preferably an arylene group having from 1 to 20 carbon atoms, such as 1,2-phenylene group, 1,3-phenylene group, 1,4-phenylene group, 1,8-naphthylene group, 1,5-naphthylene group and 2,6-naphthylene group.

$Q_1$ to $Q_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group.

The alkyl group represented by $Q_1$ to $Q_4$ is preferably an alkyl group having from 1 to 30 carbon atoms, more preferably from 1 to 15 carbon atoms, such as methyl group, tert-butyl group and cyclohexyl group.

The alkenyl group is preferably an alkenyl group having from 2 to 30 carbon atoms, more preferably from 2 to 15 carbon atoms, such as vinyl group, 1-propenyl group, 1-buten-2-yl group and cyclohexen-1-yl group.

The alkynyl group is preferably an alkynyl group having from 2 to 30 carbon atoms, more preferably from 2 to 15 carbon atoms, such as ethynyl group and 1-propynyl group.

The aryl group is preferably an aryl group having from 6 to 30 carbon atoms, more preferably from 6 to 15 carbon atoms, such as phenyl group, tolyl group, xylyl group, naphthyl group, biphenylyl group and pyrenyl group.

The heterocyclic group and heteroaryl group each is a preferably a 5- or 6-membered ring and may be condensed with another ring. Examples of the heteroatom include a nitrogen atom, an oxygen atom and a sulfur atom. The heterocyclic group and heteroaryl group each is preferably a heterocyclic or heteroaryl group having from 2 to 30 carbon atoms, more preferably from 2 to 15 carbon atoms, such as pyridyl group, piperidyl group, oxazolyl group, oxadiazolyl group, tetrahydrofuryl group and thienyl group.

The heterocyclic ring represented by V above has the same meaning as the heterocyclic group described here.

The alkoxy group is preferably an alkoxy group having from 1 to 30 carbon atoms, more preferably from 1 to 15 carbon atoms, such as methoxy group, ethoxy group and cyclohexyloxy group.

The aryloxy group is preferably an aryloxy group having from 6 to 30 carbon atoms, more preferably from 6 to 15 carbon atoms, such as phenoxy group, 1-naphthoxy group and 4-phenylphenoxy group.

Examples of the heterocyclic ring in the heterocyclic oxy group, heteroaryloxy group, heterocyclic amino group and heteroarylamino group are the same as those described above.

The amino group in the alkylamino group, arylamino group, heterocyclic amino group and heteroarylamino group may be either a primary ammo group or a secondary amino group.

These groups represented by G and $Q_1$ to $Q_4$ each may have a substituent, if possible, and examples of the substituent include a halogen atom, a cyano group, a formyl group, an alkyl group, an alkenyl group, an alkynyl group, an aryl group, a heterocyclic group, a primary, secondary or tertiary amino group, an imino group, an alkoxy group, an aryloxy group, an alkylthio group, an arylthio group, a carbonamido group, a sulfonamido group, a carbamoyl group, a sulfamoyl group, an alkylcarbonyl group, an arylcarbonyl group, an alkylsulfonyl group, an arylsulfonyl group, an alkoxycarbonyl group, an aryloxycarbonyl group, an alkylcarbonyloxy group, an arylcarbonyloxy group, a urethane group, a ureido group and a carbonyl acid ester group. Among these, preferred are an alkyl group, an aryl group, an alkoxy group and an aryloxy group, more preferred are an alkyl group and an aryl group.

When the substituent is a halogen atom, the halogen atom is preferably a fluorine atom, a chlorine atom, a bromine atom or an iodine atom.

When the substituent is an alkyl group, the alkyl group is preferably an alkyl group having from 1 to 30 carbon atoms, more preferably from 1 to 15 carbon atoms, such as methyl group, tert-butyl group and cyclohexyl group.

The alkenyl group is preferably an alkenyl group having from 2 to 30 carbon atoms, more preferably from 2 to 15 carbon atoms, such as vinyl group, 1-propenyl group, 1-buten-2-yl group and cyclohexen-1-yl group.

The alkynyl group is preferably an alkynyl group having from 2 to 30 carbon atoms, more preferably from 2 to 15 carbon atoms, such as ethynyl group and 1-propynyl group.

The aryl group is preferably an aryl group having from 6 to 30 carbon atoms, more preferably from 6 to 15 carbon atoms, such as phenyl group, tolyl group, xylyl group, naphthyl group, biphenylyl group and pyrenyl group.

The heterocyclic group is a preferably a 5- or 6-membered ring and may be condensed with another ring. Examples of the heteroatom include a nitrogen atom, an oxygen atom and a sulfur atom. The heterocyclic group is preferably a heterocyclic group having from 2 to 30 carbon atoms, more preferably from 2 to 15 carbon atoms, such as pyridyl group, piperidyl group, oxazolyl group, oxadiazolyl group, tetrahydrofuryl group and thienyl group.

Examples of the primary, secondary or tertiary amino group include an amino group, an alkylamino group, an arylamino group, a dialkylamino group, a diarylamino group, an alkylarylamino group, a heterocyclic amino group and a bisheterocyclic amino group. The amino group is preferably a tertiary amino group having from 1 to 30 carbon atoms, more preferably from 1 to 16 carbon atoms, such as dimethylamino group, diphenylamino group and phenylnaphthylamino group.

The imino group is a group represented by —$CR_{11}$=$NR_{12}$ or —N=$CR_{13}R_{14}$, wherein $R_1$ to $R_{14}$ is a hydrogen atom or a group selected from an alkyl group, an aryl group, a heterocyclic group, an alkoxy group, an aryloxy group, a primary amino group, a secondary amino group and a tertiary amino group. The imino group is preferably an imino group having from 1 to 30 carbon atoms, more preferably from 1 to 15 carbon atoms.

The alkoxy group is preferably an alkoxy group having from 1 to 30 carbon atoms, more preferably from 1 to 15 carbon atoms, such as methoxy group, ethoxy group and cyclohexyloxy group.

The aryloxy group is preferably an aryloxy group having from 6 to 30 carbon atoms, more preferably from 6 to 15 carbon atoms, such as phenoxy group, 1-naphthoxy group and 4-phenylphenoxy group.

The alkylthio group is preferably an alkylthio group having from 1 to 30 carbon atoms, more preferably from 1 to 15 carbon atoms, such as methylthio group, ethylthio group and cyclohexylthio group.

The arylthio group is preferably an arylthio group having from 6 to 30 carbon atoms, more preferably from 6 to 15 carbon atoms, such as phenylthio group and tolylthio group.

The carbonamido group is preferably a carbonamido group having from 1 to 30 carbon atoms, more preferably from 1 to 15 carbon atoms, such as acetamido group, benzoylamido group and N-methylbenzoylamido group.

The sulfonamido group is preferably a sulfonamido group having from 1 to 30 carbon atoms, more preferably from 1 to 15 carbon atoms, such as methanesulfonamido group, benzenesulfonamido group and p-toluenesulfonamido group.

The carbamoyl group is preferably a carbamoyl group having from 1 to 30 carbon atoms, more preferably from 1 to 15 carbon atoms, such as unsubstituted carbamoyl group, methylcarbamoyl group, dimethylcarbamoyl group, phenylcarbamoyl group, diphenylcarbamoyl group and dioctylcarbamoyl group.

The sulfamoyl group is preferably a sulfamoyl group having from 1 to 30 carbon atoms, more preferably from 1 to 15 carbon atoms, such as unsubstituted sulfamoyl group, methylsulfamoyl group, dimethylsulfamoyl group, phenylsulfamoyl group, diphenylsulfamoyl group and dioctylsulfamoyl group.

The alkylcarbonyl group is preferably an alkylcarbonyl group having from 1 to 30 carbon atoms, more preferably from 1 to 15 carbon atoms, such as acetyl group, propionyl group, butyroyl group and lauroyl group.

The arylcarbonyl group is preferably an arylcarbonyl group having from 6 to 30 carbon atoms, more preferably from 6 to 15 carbon atoms, such as benzoyl group and naphthoyl group.

The alkylsulfonyl group is preferably an alkylsulfonyl group having from 1 to 30 carbon atoms, more preferably from 1 to 15 carbon atoms, such as methanesulfonyl group and ethanesulfonyl group.

The arylsulfonyl group is preferably an arylsulfonyl group having from 6 to 30 carbon atoms, more preferably from 6 to 15 carbon atoms, such as benzenesulfonyl group, p-toluenesulfonyl group and 1-naphthalenesulfonyl group.

The alkoxycarbonyl group is preferably an alkoxycarbonyl group having from 1 to 30 carbon atoms, more preferably from 1 to 15 carbon atoms, such as methoxycarbonyl group, ethoxycarbonyl group and butoxycarbonyl group.

The aryloxycarbonyl group is preferably an aryloxycarbonyl group having from 6 to 30 carbon atoms, more preferably from 6 to 15 carbon atoms, such as phenoxycarbonyl group and 1-naphthoxycarbonyl group.

The alkylcarbonyloxy group is preferably an alkylcarbonyloxy group having from 1 to 30 carbon atoms, more preferably from 1 to 15 carbon atoms, such as acetoxy group, propionyloxy group and butyroyloxy group.

The arylcarbonyloxy group is preferably an arylcarbonyloxy group having from 6 to 30 carbon atoms, more preferably from 6 to 15 carbon atoms, such as benzoyloxy group and 1-naphthoyloxy group.

The urethane group is preferably a urethane group having from 1 to 30 carbon atoms, more preferably from 1 to 15 carbon atoms, such as methoxycarbonamido group, phenoxycarbonamido group and methylaminocarbonamido group.

The ureido group is preferably a ureido group having from 1 to 30 carbon atoms, more preferably from 1 to 15 carbon atoms, such as methylaminocarbonamido group, dimethylaminocarbonamido group and diphenylaminocarbonamido group.

The carbonic ester group is preferably a carbonic ester group having from 1 to 30 carbon atoms, more preferably from 1 to 15 carbon atoms, such as methoxycarbonyloxy group and phenoxycarbonyloxy group.

Among these substituents, preferred are an alkyl group, an aryl group, an alkoxy group and an aryloxy group, more preferred are an alkyl group and an aryl group.

X and Z each is preferably a hydrogen atom or an ammo group substituted by an alkyl group.

X and Z may combine with each other to form a ring. k and n each represents 0 or 1, preferably 0.

The compound represented by formula (B) can be used in an amount over a wide range but the amount added thereof is preferably from 0.1 to 80 mass %, more preferably from 1 to 50 mass %.

Specific examples of the compound represented by formula (B) are set forth below, but the present invention is of course not limited thereto.

Specific Examples urea
methylurea
N,N'-dimethylurea
tetramethylurea
ethylurea
tetraethylurea
ethyleneurea
imidazolidinone
sulfonylurea
oxamide
hexamethylphosphotriamide (HMPA)
oxazolidinone
4-isopropyloxazolidinone
2-methyl-2-oxazoline
2-ethyl-2-oxazoline
hydroxyurea tetrahydro-2-pyrimidone
semicarbazide
buiret
glycoluril
hydantoin
1-methylhydantoin
5,5-dimethylhydantoin
5-hydantoinacetic acid
allantoin
parabanic acid
urazole
4-methylurazole
5,6-dihydrouracil
barbituric acid
1,3-dimethylbarbituric acid
dimethyloxamide
malondiamide
succinamide
adipamide
sebacinamide
fumalamide
2-oxazolidone
3-methyl-2-oxazolidinone
2,5-oxazolidinedione By containing the compound represented by formula (B), the ejection stability of the ink is enhanced and this effect is lasting, so that even when the ink is aged in the state of being charged in an inkjet printer, excellent election property can be maintained.

The ink of the present invention preferably further contains an antiseptic.

The antiseptic as used in the present invention means a substance having a function of preventing the generation and growth of microorganisms, particularly bacteria-fingi (mold).

As for the antiseptic usable in the present invention, various antiseptics can be used.

These are inorganic antiseptics containing a heavy metal ion (for example, containing silver ion), and salts. Also, various organic antiseptics can be used, such as quaternary ammonium salts (e.g., tetrabutylammonium chloride, cetylpyridinium chloride, benzyltrimethylammonium chloride), phenol derivatives (e.g., phenol, cresol, butylphenol, xylenol, bisphenol), phenoxy ether derivatives (e.g., phenoxyethanol), heterocyclic compounds (e.g., benzotriazole, Proxel, 1,2-benzisothiazolin-3-one), acid amides, carbamic acid, carbamates, amidines•guanidines, pyrimidines (e.g., sodium pyrimidinethione-1-oxide), diazines, triazines, pyrroles•imidazoles, oxazoles•oxazines, thiazoles•thiazines, thioureas, thiosemicarbazides, dithiocarbamates, sulfides, sulfoxides, sulfones, sulfamides, antibiotics (e.g., penicillin, tetracycline), sodium dehydroacetate, sodium benzoate, ethyl p-hydroxybenzoate, and salts thereof. As for the antiseptic, those described, for example, in Bokin Bobi Handbook (Handbook of Microbicide and Bactericide), Gihodo (1986), and Bokin Bobai Zai Jiten (Dictionary of Microbicide and Fungicide), compiled by Nippon Bokin Bobai Gakkai Jiten Henshu Iinkai can be used.

These various compounds having a oil-soluble structure or a water-soluble structure may be used, but water-soluble compounds are preferred.

Particularly, in the present invention, when two or more of these antiseptics are used in combination, the ejection stability of the ink after aging for a long time is remarkably enhanced and the effect of the present invention is more successfully exerted. In the case of combining two or more antiseptics, the antiseptic species are preferably differing in the skeleton of the chemical structure. Also, in the case of containing two or more antiseptics, at least one antiseptic is preferably a heterocyclic compound. Preferred examples of the combination include a combination of a heterocyclic compound and an antibiotic, and a combination of a heterocyclic compound and a phenol derivative. The content ratio of two antiseptics combined is not particularly limited but is preferably antiseptic A/antiseptic B=0.01 to 100 (by mass).

The antiseptic can be used in an amount over a wide range, but the amount added thereof is preferably from 0.001 to 10 mass %, more preferably from 0.1 to 5 mass %.

The antiseptic contributes to the ejection stability of the ink by virtue of its function described above. Furthermore, change in the status, such as aggregation of dye, can be prevented and the color hue can be stably maintained. Some compounds additionally have the same function as those of other functional components described in the present invention and are included in the description of such functional components.

In the ink of the present invention, in order to obtain a full color image together with the yellow dye according to the present invention or adjust the color tone (particularly, in the case of use in a dark yellow ink or black ink), other dyes may be used in combination. Examples of the dye which can be used in combination include the followings.

The dye used in combination may be a dye (monodisperse coloring matter) in a narrow sense or may be a pigment. Also, a water-insoluble pigment may be dispersed in a dye-based ink or a water-soluble dye may be contained in a pigment-based ink.

In the case where the dye represented by formula (I) and another dye or pigment are present in combination in one ink composition, the total concentration thereof is from 0.2 to 20 mass %, preferably from 0.5 to 15 mass %.

The dye which can be used in combination with the yellow dye according to the present invention, for example, the dye represented by formula (1), is used in an ink of an ink set having the same main absorption region or in an ink or ink set combined therewith having a different main absorption region. Examples of the coloring matter which can be used in combination include the followings.

Dyes known in this field, such as triarylmethane dye, anthraquinone dye, anthrapyridone dye, azomethine dye, azo dye, cyanine dye, merocyanine dye and oxonol dye, can be used individually or in combination.

Examples of the yellow dye include aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-based dyes such as naphthoquinone dye and anthraquinone dye. Other examples of the dye species include quinophthalone dye, nitro-nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-based dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo•thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

A black dye such as polyazo dye can also be used.

Examples of the water-soluble dye include a direct dye, an acid dye, a food dye, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

In the ink composition of the present invention, for adjusting the color tone so as to obtain a full color image, other coloring materials can be used together with the above-described dye. Examples of the other coloring material which can be used together include the following pigments.

As the pigment for use in the present invention, commercially available pigments and known pigments described in various publications can be used. Examples of the publication include Color Index, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the pigment include organic pigments such as azo pigments (e.g., azo lake pigment, insoluble azo pigment, condensed azo pigment, chelate azo pigment), polycyclic pigments (e.g., phthalocyanine-based pigment, anthraquinone-based pigment, perylene- or perynone-based pigment, indigo-based pigment, quinacridone-based pigment, dioxazine-based pigment, isoindolinone-based pigment, quinophthalone-based pigment, diketopyrrolopyrrole-based pigment), dyeing lake pigments (lake pigments of acidic or basic dye) and azine pigments, and inorganic pigments such as C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

The pigment having a color tone preferred for the formation of an image includes the followings. As for the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As for the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-based pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-based C.I. Pigment Red 81:1 and C.I. Pigment Violet 1, 2, 3, 27 and 39), dioxazine-based pigments (for example, C.I. Pigment Violet 23 and 37), diketopyrrolopyrrole-based pigments (for example, C.I. Pigment Red 254), perylene pigments (for example, C.I. Pigment Violet 29), anthraquinone-based pigments (for example, C.I. Pigment Violet 5:1, 31 and 33) and thioindigo-based pigments (for example, C.I. Pigment Red 38 and 88) are preferred.

As for the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment 93, 94, 95, 128 and 155, and benzimidazolone-type C.I. Pigment Yellow 120, 151, 154, 156 and 180, and among these, those not using a benzidine-based compound as a raw material are more preferred), isoindoline-isoindolinone-based pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As for the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The pigment which can be used in the present invention may be the above-described pigment as-is or may be the pigment subjected to a surface treatment. The surface treatment may be performed, for example, by a method of applying a surface coat with resin or wax, a method of attaching a surfactant, or a method of binding a reactive substance (for example, a radical generated from a silane coupling agent, an epoxy compound, a polyisocyanate or a diazonium salt) to the pigment surface, and these methods are described in the following publications and patents:

(1) *Kinzoku Sekken no Seishitsu to Oyo* (*Properties and Applications of Metal Soap*), Saiwai Shobo;

(2) *Insatsu Ink Insatsu* (*Printing Ink Printing*), CMC Shuppan (1984);

(3) *Saishin Ganryo Oyo Gijutsu* (*Newest Pigment Application Technology*), CMC Shuppan (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. patents of (4) and capsulated pigments prepared by the method described in Japanese patent publications of (5) are effective, because dispersion stability can be obtained without using an excess dispersant in the ink.

In the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the present invention is, after dispersion, preferably from 0.01 to 10 μm, more preferably from 0.05 to 1 μm.

As for the method of dispersing the pigment, known dispersion techniques used for the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Shuppan (1986).

Other components which can be contained in each constituent ink of the ink set for inkjet recording of the present invention are described below.

Each constituent ink may contain a surfactant and by containing a surfactant, the liquid properties of ink can be controlled to provide excellent effects such as enhancement of ejection stability of ink, improvement of water resistance of image, and prevention of bleeding of ink printed.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content is from 0.001 to 15 mass %, preferably from 0.005 to 10 mass %, more preferably from 0.01 to 5 mass %, based on the ink.

Each constituent ink can be prepared by dissolving and/or dispersing the constituent components such as dye, and a surfactant in an aqueous medium. The term "aqueous medium" as used in the present invention means water or a mixture of water and a small amount of water-miscible organic solvent, where additives such as wetting agent, stabilizer and antiseptic are added, if desired.

The ink of the present invention preferably further contains at least one organic solvent having a boiling point of 150° C. or more, more preferably at least one organic solvent having a boiling point of 150° C. or more and at least one organic solvent having a boiling point of less than 150° C. In this field, these organic solvents are materials having a function as a drying inhibitor, a penetration accelerator, a wetting agent or the like for the inkjet recording ink. A water-miscible organic solvent is particularly preferred. For preventing color bleeding of the image drawn, this can be achieved when the organic solvent is water-miscible. Examples of such a compound include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

The present invention has a characteristic feature that at least one organic solvent having a boiling point of 150° C. or more and at least one organic solvent having a boiling point of less than 150° C. are used in combination, and out of the solvents described above, examples of the low boiling point solvent having a boiling point of less than 150° C. include methanol, ethanol, n-propanol, i-propanol, n-butanol, 2-butanol, tert-butanol, 2-methoxyethanol, 1-methoxy-2-propanol, 2-methoxy-1-propanol, acetone and acetonitrile. Among these, alcohol-based solvents are preferred.

The organic solvent having a boiling point of 150° C. or more may be selected from those described above but also in this case, alcohol-based solvents are preferred.

These water-miscible organic solvents are preferably contained in a total amount of 5 to 60 mass %, more preferably from 10 to 45 mass %, based on the ink.

Those low boiling point solvents may be used in combination of two or more thereof, and those high boiling point solvents may also be used in combination of two or more thereof. The ratio of the low boiling point solvent is preferably from 1 to 80 mass %, more preferably from 5 to 50 mass %, in the entire organic solvent.

In preparing the ink solution of the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in this field can be used, such as flow stirring and stirring utilizing a shearing force with use of a reversal agitator or a dissolver. Also, a stirring method utilizing a shearing force with the bottom surface of a vessel, such as magnetic stirrer, can be advantageously used.

In the case where the dye usable in the present invention is an oil-soluble dye, the ink solution can be prepared by dissolving the oil-soluble dye in a water-insoluble high boiling point organic solvent and emulsion-dispersing it in an aqueous medium.

The water-insoluble high boiling point organic solvent for use in the present invention has a boiling point of 150° C. or more, preferably 170° C. or more.

Examples thereof include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid and diphenylphosphoric acid). The high boiling point organic solvent can be used in an amount of, in terms of mass ratio to the oil-soluble dye, from 0.01 to 3 times, preferably from 0.01 to 1.0 times.

These water-insoluble high boiling point organic solvents may be used individually or as a mixture of several kinds [for example, a mixture of tricresyl phosphate and dibutyl phthalate, a mixture of trioctyl phosphate and di(2-ethylhexyl) sebacate, or a mixture of dibutyl phthalate and poly(N-tert-butylacrylamide)].

Examples of the high boiling point organic solvent for use in the present invention, other than the above-described compounds, and/or the synthesis method of these high boiling point organic solvents are described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A4-346338.

The high boiling point organic solvent is used in an amount of, in terms of mass ratio to the oil-soluble dye, from 0.01 to 3.0 times, preferably from 0.01 to 1.0 times.

In the present invention, the oil-soluble dye or high boiling point organic solvent is used by emulsion-dispersing it in an aqueous medium. Depending on the case, a low boiling point organic solvent may be used at the emulsion-dispersion in view of emulsifiability. The low boiling point organic solvent is an organic solvent having a boiling point of about 30 to 150° C. under atmospheric pressure. Preferred examples thereof include, but are not limited to, esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane).

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, but a so-called phase inversion emulsification method of adding dropwise an aqueous phase in an oil phase can also be preferably used.

In the present invention, various surfactants can be used at the emulsion-dispersion. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-based polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Other than these, natural water-soluble polymers such as polysaccharides, casein and gelatin are also preferably used. Furthermore, for the stabilization of dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains $-SO^{2-}$ or $-COO^-$. In the case of using this polymer which does not substantially dissolve in an aqueous medium, the polymer is preferably used in an amount of 20 mass % or less, more preferably 10 mass % or less, based on the high boiling point organic solvent.

In preparing an aqueous ink by dispersing the oil-soluble dye or high boiling point organic solvent through emulsion-dispersion, the control of particle size is important. In order to elevate the color purity or density of an image formed by the inkjet recording, it is essential to reduce the average particle size. The average particle size is, in terms of the volume average particle size, preferably 1 µm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza (Lecture of Experimental Chemistry)*, 4th ed., pp. 417-418. For example, the ink is diluted with distilled water to a particle concentration of 0.1 to 1 mass %, then, the particle size can be easily measured by a commercially available volume average particle size measuring apparatus (for example, Microtrac UPA (manufactured by Nikkiso K.K.)). The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles by the volume of the particle and dividing the sum total of the obtained values by the total volume of the particles. The volume average particle size is described in Soichi Muroi, *Kobunshi Latex no Kagaku (Chemistry of Polymer Latex)*, page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about ejection failure or ejection slippage of ink and this seriously affects the printing performance. In order to prevent these troubles, it is important to reduce the number of particles having a particle size of 5 µm or more to 10 or less and the number of particles having a particle size of 1 µm or more to 1,000 or less, in 1 µl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

For effectively reducing the average particle size and eliminating coarse particles, a mechanical emulsifying apparatus may be used.

As for the emulsifying apparatus, known apparatuses such as simple stirrer, impeller stirring system, in-line stirring system, mill system (e.g., colloid mill) and ultrasonic system can be used, but a high-pressure homogenizer is particularly preferred.

The mechanism of the high-pressure homogenizer is described in detail in U.S. Pat. No. 4,533,254 and JP-A-647264. Examples of the commercially available apparatus include Gaulin Homogenizer (manufactured by A.P.V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus and after adding additives such as wetting agent and surfactant, again passing the dispersion through a high-pressure homogenizer during filling of the ink into a cartridge is preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent, such as evaporation, vacuum evaporation and ultrafiltration. This removal of the low boiling point organic solvent is preferably performed as soon as possible immediately after the emulsification.

In the inkjet recording ink set obtained by the present invention or in a constituent ink thereof, additives such as drying inhibitor for preventing clogging due to drying of ink at the ejection port, penetration accelerator for more successfully penetrating the ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent, may be appropriately selected and used in an appropriate amount.

The drying inhibitor for use in the present invention is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in an amount of 10 to 50 mass % based on the ink.

Examples of the penetration accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 mass % of the penetration accelerator in the ink. The penetration accelerator is preferably used in an amount of causing no blurring of printed letter or no print through.

Examples of the ultraviolet absorbent which can be used in the present invention for improving the preservability of image include benzotriazole-based compounds described in JP-A-58-185677, JP-A-61-190537, JP-A-2-782, JP-A-5-197075 and JP-A-9-34057, benzophenone-based compounds described in JP-A-46-2784, JP-A-5-194483 and U.S. Pat. No. 3,214,463, cinnamic acid-based compounds described in JP-B-48-30492 (the term "JP-B" as used herein means an "examined Japanese patent publication"), JP-B-56-21141 and JP-A-10-88106, triazine-based compounds described in JP-A-4-298503, JP-A-8-53427, JP-A-8-239368, JP-A-10-182621 and JP-T-8-501291, compounds described in Research Disclosure No. 24239, and compounds of absorbing ultraviolet light and emitting fluorescent light, so-called fluorescent brightening agents, as represented by stilbene-based compounds and benzoxazole-based compounds.

As for the antioxidant which is used in the present invention for improving the preservability of image, various organic or metal complex-based discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in Research Disclosure, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

The pH adjusting agent for use in the present invention can be suitably used in terms of adjusting the pH and imparting dispersion stability. The pH of the ink is preferably adjusted to 4 to 11 at 25° C. If the pH is less than 4, the solubility of dye decreases to readily cause clogging of a nozzle, whereas if it exceeds 11, the water resistance tends to deteriorate. Examples of the pH adjusting agent include organic bases and inorganic alkalis for giving a basic pH, and organic acids and inorganic acids for giving an acidic pH.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include an acetic acid, a propionic acid, a trifluoroacetic acid and an alkylsulfonic acid. Examples of the inorganic acid include a hydrochloric acid, a sulfuric acid and a phosphoric acid.

In the present invention, apart from the above-described surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SUR-FYNOLS (produced by Air Products & Chemicals), which are an acetylene-based polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and Research Disclosure, No. 308119 (1989) can also be used.

The surface tension of the ink of the present invention is, with or without use of such a surface tension adjusting agent, preferably from 20 to 60 mN/m, more preferably from 25 to 45 mN/m.

The ink of the present invention preferably has a viscosity of 30 mPa·s or less. The viscosity is more preferably adjusted to 20 mPa·s or less and for the purpose of adjusting the viscosity, a viscosity adjusting agent is sometimes used. Examples of the viscosity adjusting agent include celluloses, water-soluble polymers such as polyvinyl alcohol, and nonionic surfactants. The viscosity adjusting agent is described in detail in *Nendo Chosei Gijutsu (Viscosity Adjusting Technology)*, Chap. 9, Gijutsu Joho Kyokai (1999), and *Inkjet Printer Yo Chemicals (98 Zoho)—Zairyo no Kaihatsu Doko•Tenbo Chosa—(Chemicals for Inkjet Printer (Enlarged Edition of 98)—Survey on Development Tendency•Prospect of Materials—)*, pp. 162-174, CMC (1997).

In the present invention, if desired, various cationic, anionic or nonionic surfactants described above may be used as a dispersant or a dispersion stabilizer, and fluorine- or silicone-based compounds or chelating agents as represented by EDTA may be used as a defoaming agent.

In preparing the ink solution of the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in this field can be used, such as flow stirring and stirring utilizing a shearing force with use of a reversal agitator or a dissolver. Also, a stirring method utilizing a shearing force with the bottom surface of a vessel, such as magnetic stirrer, can be advantageously used.

The recording paper and recording film for use in the image recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film sheet may be used. The thickness of the support is preferably from 10 to 250 µm and the basis weight is preferably from 10 to 250 g/m².

An image-receiving layer and a backcoat layer may be provided on the support as it is to produce an image-receiving material, or after providing a size press or an anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

In the present invention, the support is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-based pigment, acryl-based pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production process or a silicic acid hydrate obtained by a wet production process, but a silicic acid hydrate is preferred. These pigments may be used in combination of two or more thereof.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and separation resistance of the image-receiving layer.

The image-receiving layer may contain a mordant, a water-proofing agent, a light fastness enhancer, a surfactant, a hardening agent and other additives in addition to the pigment and aqueous binder.

The mordant added to the image-receiving layer is preferably immobilized and for this purpose, a polymer mordant is preferably used.

The polymer mordant is described in JP-A48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent pictorial quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cationic polyacrylamide and colloidal silica. Among these cationic resins, polyamidopolyamine epichlorohydrin is preferred. The content of the cationic resin is preferably from 1 to 15 mass %, more preferably from 3 to 10 mass %, based on the entire solid content of the ink-receiving layer.

Examples of the light fastness enhancer include zinc sulfate, zinc oxide, hindered amine-based antioxidant and benzotriazole-based ultraviolet absorbent such as benzophenone. Among these, zinc sulfate is preferred.

The surfactant functions as a coating aid, a releasability improver, a slipperiness improver or an antistatic agent. This surfactant is described in JP-A-62-173463 and JP-A-62-183457.

Instead of the surfactant, an organofluoro compound may be used. The organofluoro compound is preferably hydrophobic. Examples of the organofluoro compound include fluorine-containing surfactants, oily fluorine-based compounds (for example, fluorine oil) and solid fluorine compound resins (for example, ethylene tetrafluoride resin). The organofluoro compound is described in JP-B-57-9053 (columns 8 to 17), JP-A-61-20994 and JP-A-62-135826.

Examples of the hardening agent which can be used include the materials described in JP-A-1-161236 (page 222).

Other examples of the additive added to the image-receiving layer include a pigment dispersant, a thickener, a defoaming agent, a dye, a fluorescent brightening agent, an antiseptic, a pH adjusting agent, a matting agent and a hardening agent. The image-receiving layer may be composed of ether one layer or two layers.

In the recording paper or film, a backcoat layer may also be provided. Examples of the component which can be added to this layer include a white pigment, an aqueous binder and other components.

Examples of the white pigment contained in the backcoat layer include inorganic white pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-based plastic pigment, acryl-based plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing the dimension or preventing the curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and used for a known system, for example, an electric charge control system of ejecting the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and ejecting the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the pictorial quality by using a plurality of inks having substantially the same color hue but differing in the concentration, and a system using a colorless transparent ink.

The inkjet recording ink of the present invention can also be used for uses other than the inkjet recording, such as a material for display image, an image-forming material for interior decoration, and an image-forming material for outdoor decoration.

The material for display image indicates various materials such as poster, wallpaper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo. In the case of using the dye of the present invention as a material for forming a display image, the image includes not only a strict image but also all patterns by a dye, which can be perceived by a human, such as abstract design, letter and geometrical pattern.

The material for interior decoration indicates various materials such as wallpaper, ornamental goods (e.g., ornament, doll), luminaire member, furniture member and design member of floor or ceiling. In the case of using the dye of the present invention as a material for forming an image, the image includes not only a strict image but also all patterns by a dye, which can be perceived by a human, such as abstract design, letter and geometrical pattern.

The material for outdoor decoration indicates various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns by a dye, which can be perceived by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a coloring material in the form of a reactive dye having introduced thereinto a reactive group. Among these, preferred is dyeing by mordanting.

EXAMPLES

The present invention is described below by referring to Examples, but the present invention is not limited thereto.

Example 1

<Production of Ink Set Sample>

Deionized water was added to the following components to make 1 liter and the resulting solution was stirred for 1 hour under heating at 30 to 40° C. Thereafter, the pH was adjusted to 6.0 by using 1 mol/liter of hydrochloric acid or potassium hydroxide and then the solution was filtered under reduced pressure through a microfilter having an average pore size of 0.25 μm to prepare Yellow Ink Y-101.

| [Formulation of Yellow Ink Y-101] | |
|---|---|
| (Solid Contents) | |
| Yellow dye of the present invention (Compound I-58) (λmax: 445 nm, I(λmax + 70 nm)/I(λmax): 0.013) | 35 g/liter |
| Proxel (4,5-benzisothiazolidin-3-one) | 5 g/liter |
| (Liquid Components) | |
| Triethylene glycol monobutyl ether (DGB) | 100 g/liter |
| Glycerin (GR) | 115 g/liter |
| Diethylene glycol (DEG) | 70 g/liter |
| 2-Pyrrolidone (PRD) | 35 g/liter |
| Triethanolamine (TEA) | 8 g/liter |
| Surfynol STG (SW) | 10 g/liter |

Also, Dark Yellow Ink Solution DY-101 was prepared by adding Magenta Dye (A) and Cyan Dye (B) in the formulation above.

[Formulation of Dark Yellow Ink DY-104]

(Solid Contents)

| | |
|---|---|
| Yellow dye of the present invention (Compound I-58) | 35 g/liter |
| Magenta Dye (A) | 2 g/liter |
| Cyan Dye (B) | 2 g/liter |
| Proxel (4,5-benzisothiazolidin-3-one) | 5 g/liter |

(Liquid Components)

| | |
|---|---|
| Triethylene glycol monobutyl ether (DGB) | 100 g/liter |
| Glycerin (GR) | 115 g/liter |
| Diethylene glycol (DEG) | 70 g/liter |
| 2-Pyrrolidone (PRD) | 35 g/liter |
| Triethanolamine (TEA) | 8 g/liter |
| Surfynol STG (SW) | 10 g/liter |

Dyes

A:

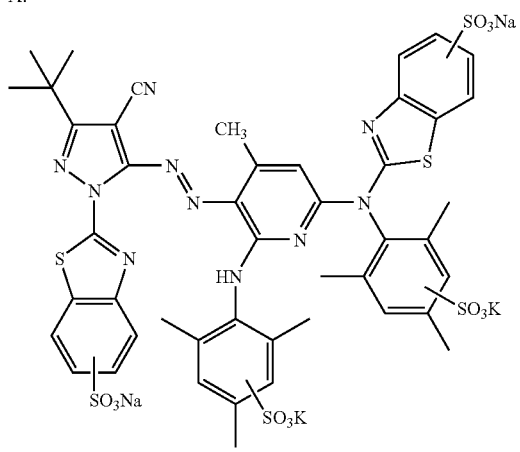

B:

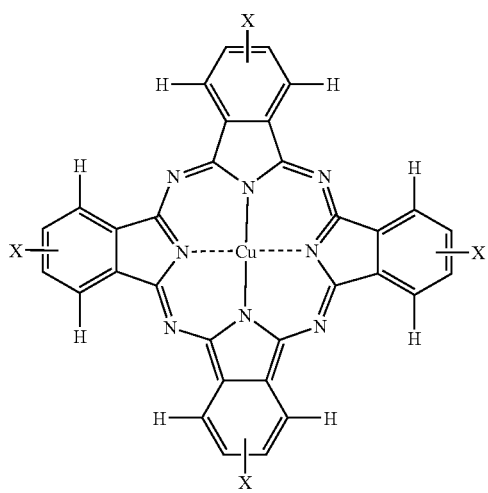

X: $SO_2CH_2CH_2CH_2SO_3Li$

The oxidation potential of Yellow Dye (1-58) used here was 1.0 V (vs SCE) or more in any measuring method, that is, a dropping mercury electrode method using a 1 mmol/liter aqueous solution of dye, a cyclic voltammetry (CV) method and a rotating ring-disk electrode method.

A yellow ink and a dark yellow ink were produced in the same manner as the inks above by using the following two dyes as comparative dyes in place of Yellow Dye I-58 (the additive composition except for the dye was the same).

1) Yellow dye having an oxidation potential of 1.0 V (vs SCE) or less, shown below (called Dye (C)):

C:

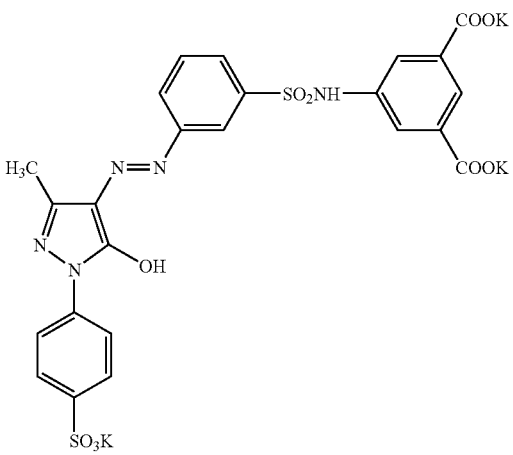

2) Yellow dye having $I(\lambda max)/I(\lambda max+70 \text{ nm})>0.4$ [Direct Yellow 11 described in C.I. (color index); called Dye (D)]

Incidentally, the $I(\lambda max)/I(\lambda max+70 \text{ nm})$ of Yellow Dye (C) was 0.4 or less and the oxidation potential of Yellow Dye (D) was 1.0 V (vs SCE) or less.

As a reference ink, the yellow ink cartridge and dark yellow ink cartridge of PM-950C manufactured by Seiko Epson Corporation were used.

By using dyes above, yellow inks and dark yellow inks shown in Table 1 were produced.

TABLE 1

| No. | Yellow Dye |
|---|---|
| PM-950C (Y, DY) (Reference) | — |
| Y-101, DY-101 (Invention) | I-58 |
| Y-102, DY-102 (Comparison) | C |
| Y-103, DY-103 (Comparison) | D |

Furthermore, Inks Y-104 to Y-109 and DY-104 to DY-104 having thoroughly the same composition except for adding the additives shown in Table 2 in the ink formulation of Y-101 and DY-101 were prepared. By using the inks prepared, ink sets having a combination shown in Table 2 were produced.

TABLE 2

| No. | Additive | |
|---|---|---|
| Y-104, DY-104 (Invention) | hydroxyethyl acetate | 15 g/liter |
| Y-105, DY-105 (Invention) | urea | 15 g/liter |
| Y-106, DY-106 (Invention) | ethyleneurea | 15 g/liter |
| Y-107, DY-107 (Invention) | buiret | 15 g/liter |
| Y-108, DY-108 (Invention) | sulfonylurea | 15 g/liter |
| Y-109, DY-109 (Invention) | HMPA | 15 g/liter |

These inks each was filled in a yellow ink-dark yellow ink cartridge of an inkjet printer PM-950C manufactured by Seiko Epson Corporation and by using the inks of PM-950C for other colors, a yellow monochromatic image pattern stepwise changed in the density (so-called step-wedge) and a gray (neutral color) image pattern (neutral color step-wedge) were drawn and used as samples for the following measurement of residual coloring matter ratio. Separately, letters were printed as follows and used as samples for the ejection stability test. Also, the color tone of the image was evaluated with an eye by using a test image chart of ISO/JIS 12640. The image-receiving sheet used was an inkjet paper sheet Photo Gloss Paper "Kassai" produced by Fuji Photo Film Co., Ltd. The image quality, ejection stability of ink, and fastness of image were evaluated as follows.

(Evaluation Tests)

1) As for the ejection stability, cartridges were set in the printer and after confirming the ejection of ink from all nozzles, the printer was stopped and left standing for 74 hours in an environment of 15° C. and 30% RH. Thereafter, letters were output on 100 sheets of A4-size image-receiving paper and evaluated based on the following criteria.

A: Printing was not disordered from start to end of printing.

B: Printing was disordered in some outputs.

C: Printing was disordered from start to end of printing.

2) As for the image preservability of the yellow dye, the pattern-drawn sample was evaluated as follows.

(1) In the evaluation of fastness to light, the image density Ci immediately after printing was measured by a reflection densitometer (X-Rite 310) using a reflection density measuring optical system defined in International Standard ISO-5 and after the image was irradiated with xenon light (85,000 lx) for 10 days by using a light fastness tester manufactured by Atlas Electric Device (Atlas Weather-O-meter C165), the image density Cf was again measured. Then, the dye residual ratio (100×Cf/Ci) was determined and evaluated. The dye residual ratio was evaluated at three points having a reflection density of 1, 1.5 and 2. The sample was rated A when the dye residual ratio was 70% or more at any density, rated B when less than 70% at two points, and rated C when less than 70% at all points.

(2) In the evaluation of fastness to heat, the density was measured by X-Rite 310 before and after the sample was stored for 10 days under the conditions of 80° C. and 70% RH, and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

(3) In the evaluation of ozone resistance, the photo gloss paper having formed thereon an image was left standing for 7 days in a box set to an ozone gas concentration of 0.5 ppm and the image density before and after standing in the ozone gas atmosphere was measured by a reflection densitometer (X-Rite 310) and evaluated as the dye residual ratio. The dye residual ratio was measured at three points having a reflection density of 1, 1.5 and 2.0. The ozone gas concentration in the box was set by using an ozone gas monitor (Model OZG-EM-01) manufactured by APPLICS.

The sample was rated on a three-stage scale, namely, rated A when the dye residual ratio was 80% or more at any density, rated B when less than 80% at one or two point(s), and rated C when less than 70% at all points.

Incidentally, the relationship of these evaluations by Ranks A, B and C with the discoloration rate constant for an ozone gas is as follows.

A: Discoloration rate constant is $1.0 \times 10^{-2}$ hour$^{-1}$ or less.

B: Discoloration rate constant is from $1.0 \times 10^{-2}$ hour$^{-1}$ to $1.0 \times 10^{-1}$ hour$^{-1}$.

C: Discoloration rate constant is $1.0 \times 10^{-1}$ hour$^{-1}$ or more.

The results obtained are shown in Table 3.

TABLE 3

| No. | Ejection Stability | Fastness to Light | Fastness to Heat | Fastness to $O_3$ |
|---|---|---|---|---|
| PM-950C (Y, DY) (Reference) | A | B | B | C |
| Y-101, DY-101 (Invention) | B | A | A | A |
| Y-102, DY-102 (Comparison) | B | C | B | C |
| Y-103, DY-103 (Comparison) | B | C | B | C |
| Y-104, DY-104 (Invention) | B | A | A | A |
| Y-105, DY-105 (Invention) | A | A | A | A |
| Y-106, DY-106 (Invention) | A | A | A | A |
| Y-107, DY-107 (Invention) | A | A | A | A |
| Y-108, DY-108 (Invention) | A | A | A | A |
| Y-109, DY-109 (Invention) | A | A | A | A |

As seen from the results in Table 3, the ink set systems using the ink of the present invention are superior to Comparative Examples in all performances of evaluation items (systems from Y-106/DY-106 to Y-109/DY-109) or superior to Comparative Examples in all items of fastness though the ejection stability is in an equal level (systems of Y-101/DY-101 and Y-105/DY-105). That is, out of Examples of the present invention, the ink sets containing the compound of formula (B) (systems from Y-106/DY-106 to Y-109/DY-109) are particularly excellent.

Apart from these, when the printed image was compared with the image of a test chart, it was revealed that the color balance was poor in the system using Yellow Dye (D), whereas the pictorial quality was good in all of Examples of the present invention.

Example 2

Yellow Ink Solution Y-201 according to the following formulation was prepared in the same manner as Y-101 in Example 1.

| [Formulation of Yellow Ink Y-201] | |
|---|---|
| (Solid Contents) | |
| Yellow Dye (YI-58) of the present invention ($\lambda$max: 445 nm, I($\lambda$max + 70 nm)/I($\lambda$max): 0.013) | 35 g/liter |
| Benzotriazole (BTZ) | 0.08 g/liter |
| (Liquid Components) | |
| Triethylene glycol monobutyl ether (DGB) | 80 g/liter |
| Glycerin (GR) | 150 g/liter |
| Diethylene glycol (DEG) | 80 g/liter |
| 2-Pyrrolidone (PRD) | 100 g/liter |
| Triethanolamine (TEA) | 8 g/liter |
| Surfynol STG (SW) | 10 g/liter |

Inks Y-202 to Y-206 were produced by changing the solvent species of Y-201 as shown in Table 4 below. The yellow dye "YI-58" denotes Compound 1-58 and the same applies to other compounds.

TABLE 4

|  | Y-201 | Y-202 | Y-203 | Y-204 | Y-205 | Y-206 |
|---|---|---|---|---|---|---|
| YI-58 | 35 g | 35 g | 35 g | 35 g | 35 g | 35 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 80 g | 80 g | 100 g | — | — | — |
| GR | 150 g | 150 g | 150 g | 100 g | 100 g | 100 g |
| TGB | 80 g | 80 g | 100 g | 50 g | 50 g | 50 g |
| TEA | 8 g | 8 g | 8 g | 8 g | 8 g | 8 g |
| SW | 10 g | 10 g | 10 g | 10 g | 10 g | 10 g |
| PRD | 100 g | — | — | — | — | — |
| TEG | — | — | — | 100 g | — | 50 g |
| MFG | — | — | — | — | 100 g | 50 g |
| DMI | — | 100 g | — | — | — | — |
| Finished Amount* | 1 liter | 1 liter | 1 liter | 1 liter | 1 liter | 1 liter |

*In all inks, water was added to make 1 liter as the finished amount.
PRD: 2-Pyrrolidone
DMI: 1,3-Dimethylimidazolidinone
MFG: 1-Methoxy-2-propanol
TEG: Triethylene glycol Also, Dark Yellow Ink Solution DY-201 was prepared by adding a magenta dye and a cyan dye in the formulation above (Magenta and Cyan Dyes (A) and (B) are the same as those used in Example 1).

[Formulation of Dark Yellow Ink DY-201]

(Solid Contents)

| Yellow Dye (YI-58) of the present invention | 35 g/liter |
|---|---|
| Magenta Dye (A) | 2 g/liter |
| Cyan Dye (B) | 2 g/liter |
| Benzotriazole (BTZ) | 0.08 g/liter |

(Liquid Components)

| Triethylene glycol monobutyl ether (TGB) | 70 g/liter |
|---|---|

-continued

[Formulation of Dark Yellow Ink DY-201]

| Glycerin (GR) | 160 g/liter |
|---|---|
| Diethylene glycol (DEG) | 80 g/liter |
| 2-Pyrrolidone (PRD) | 110 g/liter |
| Triethanolamine (TEA) | 8 g/liter |
| Surfynol STG (SW) | 10 g/liter |

Magenta Dye (A) and Cyan Dye (B) are those shown in Example 1.

Dark Yellow Inks DY-202 to DY-206 were produced by changing the ink formulation of DY-201 to the formulation shown in Table 2 below.

TABLE 5

|  | DY-201 | DY-202 | DY-203 | DY-204 | DY-205 | DY-206 |
|---|---|---|---|---|---|---|
| YI-58 | 35 g | 35 g | 35 g | 35 g | 35 g | 35 g |
| A | 2 g | 2 g | 2 g | 2 g | 2 g | 2 g |
| B | 2 g | 2 g | 2 g | 2 g | 2 g | 2 g |
| BTZ | 0.08 g | 0.08 g | 0.08 g | 0.08 g | 0.08 g | 0.08 g |
| PROXEL | 5 g | 5 g | 5 g | 5 g | 5 g | 5 g |
| DEG | 80 g | 80 g | 100 g | — | — | — |
| GR | 160 g | 160 g | 150 g | 100 g | 100 g | 100 g |
| TGB | 70 g | 70 g | 100 g | 50 g | 50 g | 50 g |
| TEA | 8 g | 8 g | 8 g | 8 g | 8 g | 8 g |
| SW | 10 g | 10 g | 10 g | 10 g | 10 g | 10 g |
| PRD | 110 g | — | — | — | — | — |
| TEG | — | — | — | 100 g | — | 50 g |
| MFG | — | — | — | — | 100 g | 50 g |
| DMI | — | 110 g | — | — | — | — |
| Finished Amount* | 1 liter | 1 liter | 1 liter | 1 liter | 1 liter | 1 liter |

*In all inks, water was added to make 1 liter as the finished amount.

Yellow Inks Y-207 and Y-208 and Dark Yellow Inks DY-207 and DY-208 were produced in the same manner by also using here Yellow Dye C or D as the dye for comparison, which were used as the dye for comparison in Example 1 (the ink composition except for the dye is the same as that of Y-201 or DY-201).

Also, as a reference ink sample, the yellow ink cartridge and dark yellow ink cartridge of PM-950C produced by Seiko Epson Corporation were used.

By using the dyes above, the yellow inks and dark yellow inks shown in Table 6 below were produced.

TABLE 6

| Sample No. | Yellow Dye |
|---|---|
| PM-950C (Y, DY) (Reference) | — |
| Y-201, DY-201 (Invention) | YI-58 |
| Y-207, DY-207 (Comparison) | C |
| Y-208, DY-208 (Comparison) | D |

These inks each was filled in a yellow ink-dark yellow ink cartridge of an inkjet printer PM-950C manufactured by Seiko Epson Corporation and by using the inks of PM-950C for other colors, the evaluation with an eye of pictorial quality (particularly, color tone) and the evaluation of ejection stability and image fastness were performed thoroughly in the same manner as in Example 1 except for differing in the ink sample. Also, the blurring of the image drawn was evaluated by the following method.

<Evaluation of Blurring of Image Under High Humidity Conditions>

A printing pattern where four yellow square patterns each in a size of 3 cm×3 cm were arrayed to form a two-line and two-column table shape with a 1-mm white clearance between respective square patterns was prepared by drawing and after this image sample was stored under conditions of 25° C. and 90% RH for 72 hours, the bleeding of yellow dye in the white clearance was observed. The sample was rated A when the increase of yellow density in the white clearance based on the density immediately after printing was 0.01 or less as measured by light through a blue filter of Status A, rated B when the increase was from 0.01 to 0.05, or rated C when the increase was 0.05 or more.

The results obtained are shown in Table 7. Incidentally, in all samples, the pictorial quality evaluated with an eye was good.

TABLE 7

| Sample No. | Ejection Stability | Fastness to Light | Fastness to Heat | Fastness to $O_3$ | Y Bleeding |
|---|---|---|---|---|---|
| PM-950C (Reference) | A | B | B | C | B |
| Y-201, DY-201 (Invention) | A | A | A | A | A |
| Y-202, DY-202 (Invention) | A | A | A | A | A |
| Y-203, DY-203 (Invention) | A | A | A | A | B |
| Y-204, DY-204 (Invention) | A | A | A | A | B |
| Y-205, DY-205 (Invention) | A | A | A | A | B |
| Y-206, DY-206 (Invention) | A | A | A | A | B |

TABLE 7-continued

| Sample No. | Ejection Stability | Fastness to Light | Fastness to Heat | Fastness to $O_3$ | Y Bleeding |
|---|---|---|---|---|---|
| Y-207, DY-207 (Comparison) | A | C | B | C | B |
| Y-208, DY-208 (Comparison) | A | C | B | C | B |

As seen from the results in Table 7, Examples of the present invention all are superior to Comparative Examples in ejection stability and in all fastness properties. Particularly, in Examples of the present invention where the compound of formula (A) is added (systems from Y-201/DY-201 and Y-202/DY-202), the bleeding of color is also prevented, revealing more excellent effect.

Apart from these, when the printed image was compared with the image of a test chart, it was revealed that the color balance was poor in the system using Yellow Dye (D), whereas good color balance was obtained in Examples of the present invention.

Example 3

Yellow Ink Solution Y-301 according to the following formulation was prepared in the same manner as Y-101 in Example 1.

[Formulation of Yellow Ink Y-301]

(Solid Contents)

| | |
|---|---|
| Yellow Dye (YI-58) of the present invention (λmax: 445 nm, I(λmax + 70 nm)/I(λmax): 0.013) | 35 g/liter |
| Urea | 10 g/liter |

(Liquid Components)

| | |
|---|---|
| Triethylene glycol monobutyl ether (DGB) | 100 g/liter |
| Glycerin (GR) | 115 g/liter |
| Diethylene glycol (DEG) | 70 g/liter |
| 2-Pyrrolidone (PRD) | 35 g/liter |
| Triethanolamine (TEA) | 8 g/liter |
| Surfynol STG (SW) | 10 g/liter |

Also, Dark Yellow Ink Solution DY-301 was prepared by adding Magenta Dye (A) and Cyan Dye (B) in the formulation above (Magenta and Cyan Dyes (A) and (B) are the same as those used in Example 1).

[Formulation of Dark Yellow Ink DY-301]

(Solid Contents)

| | |
|---|---|
| Yellow Dye (I-58) of the present invention | 35 g/liter |
| Magenta Dye (A) | 2 g/liter |
| Cyan Dye (B) | 2 g/liter |
| Urea | 10 g/liter |

(Liquid Components)

| | |
|---|---|
| Triethylene glycol monobutyl ether (DGB) | 100 g/liter |
| Glycerin (GR) | 115 g/liter |
| Diethylene glycol (DEG) | 70 g/liter |
| 2-Pyrrolidone | 35 g/liter |
| Triethanolamine (TEA) | 8 g/liter |
| Surfynol STG (SW) | 10 g/liter |

Yellow Inks Y-302 and Y-303 and Dark Yellow Inks DY-302 and DY-303 were produced in the same manner by also using here Yellow Dye C or D as the dye for comparison, which were used as the dye for comparison in Example 1, in place of Yellow Dye YI-58 of Y-301 and DY-301 (the ink composition except for the dye is the same as that of Y-301 or DY-301).

Also, Inks Y-104 to Y-111 and DY-104 to DY-111 each having thoroughly the same composition as in respective formulations of those three pairs of dyes except for adding additives (e.g., antiseptic) as shown in Table 8 were produced.

TABLE 8

| No. | Yellow Dye | Additives (e.g., antiseptic) |
|---|---|---|
| PM-950C (Y, DY) (Reference) | — | — |
| Y-301, DY-301 (Invention) | YI-58 | none |
| Y-302, DY-302 (Comparison) | C | none |
| Y-303, DY-303 (Comparison) | D | none |
| Y-304, DY-304 (Invention) | YI-58 | 5 g/liter of ethylene glycol to Y-301 and DY-301 |
| Y-305, DY-305 (Comparison) | C | 5 g/liter of ethylene glycol to Y-302 and DY-302 |
| Y-306, DY-306 (Comparison) | D | 5 g/liter of ethylene glycol to Y-303 and DY-303 |
| Y-307, DY-307 (Invention) | YI-58 | 2 g/liter phenoxyethanol to Y-301 and DY-301 |
| Y-308, DY-308 (Comparison) | C | 5 g/liter phenoxyethanol to Y-302 and DY-302 |
| Y-309, DY-309 (Comparison) | D | 5 g/liter phenoxyethanol to Y-303 and DY-303 |
| Y-310, DY-310 (Invention) | YI-58 | 1 g/liter of Proxel + 1 g/liter of phenoxyethanol to Y-301 and DY-301 |
| Y-311, DY-311 (Invention) | YI-58 | 2 g/liter of Proxel + 2 g/liter of phenoxyethanol to Y-301 and DY-301 |

These inks each was filled in a yellow ink-dark yellow ink cartridge of an inkjet printer PM-950C manufactured by Seiko Epson Corporation and by using the inks of PM-950C for other colors, the evaluation with an eye of pictorial quality (particularly color tone) and the evaluation of ejection stability and image fastness were performed thoroughly in the same manner as in Example 1 except for differing in the ink sample.

Also, as a reference ink, the yellow ink cartridge and dark yellow ink cartridge of PM-950C produced by Seiko Epson Corporation were used.

The results obtained are shown in Table 9.

TABLE 9

| No. | Ejection Stability A | Ejection Stability B | Fastness to Light | Fastness to Heat | Fastness to $O_3$ |
|---|---|---|---|---|---|
| PM-950C (Y, DY) (Reference) | A | A | B | B | C |
| Y-301, DY-301 (Invention) | A | C | A | A | A |
| Y-302, DY-302 (Comparison) | A | C | C | B | C |
| Y-303, DY-303 (Comparison) | A | C | C | C | C |
| Y-304, DY-304 (Invention) | A | C | A | A | A |
| Y-305, DY-305 (Comparison) | A | C | C | B | C |
| Y-306, DY-306 (Comparison) | A | C | C | C | C |
| Y-307, DY-307 (Invention) | A | A | A | A | A |
| Y-308, DY-308 (Comparison) | A | A | C | B | C |
| Y-309, DY-309 (Comparison) | A | A | C | C | C |
| Y-310, DY-310 (Invention) | A | A | A | A | A |
| Y-311, DY-311 (Invention) | A | A | A | A | A |

As seen from the results in Table 9, Examples of the present invention all are satisfied in the ejection stability and also in all fastness properties to light, heat and ozone, and superior to Comparative Examples. Particularly, in the system using the ink of the present invention where phenoxyethanol or Proxel is added, the ejection property is stabilized and at the same time, the performances in the fastness to light, heat and oxidation are surpassing those of Comparative Examples. Furthermore, when two fungicides are used in combination, the effect is more enhanced.

Apart from these, when the printed image was compared with the image of a test chart, it was revealed that the color balance was poor in the system using Yellow Dye (D), whereas excellent pictorial quality free from deviation in color balance was obtained in all of Examples using the ink of the present invention.

Furthermore, when the ejection property was compared after storing the ink cartridge for 6 weeks under the conditions of 40° C. and 80% RH, the ejection property of Rank A was maintained in the systems using Y-310/DY-310 or Y-311/DY-311, but the ejection property was Rank B in the systems of Y-301/DY-301, Y-304/DY-304 and Y-307/DY-307 and Rank C in other systems. Also from these, the effect of the present invention is clearly verified.

Example 4

Yellow Ink Solution Y-401 according to the following formulation was prepared in the same manner as Y-101 in Example 1.

| [Formulation of Yellow Ink Y-401] | |
|---|---|
| (Solid Contents) | |
| Yellow Dye (YI-58) of the present invention (λmax: 445 nm, I(λmax + 70 nm)/I(λmax): 0.013) | 35 g/liter |
| Proxel (4,5-benzisothiazolidin-3-one) | 3.5 g/liter |
| Benzotriazole (BTZ) | 0.08 g/liter |
| Urea | 10 g/liter |
| (Liquid Components) | |
| Triethylene glycol monobutyl ether (DGB) | 130 g/liter |
| Glycerin (GR) | 115 g/liter |
| Diethylene glycol (DEG) | 120 g/liter |
| 2-Pyrrolidone (PRD) | 35 g/liter |
| Triethanolamine (TEA) | 8 g/liter |
| Surfynol STG (SW) | 10 g/liter |

Also, Inks Y-402 to Y-406 were prepared by changing the solvent species of Y-401 as shown in the Table below.

TABLE 10

|  | Y-401 | Y-402 | Y-403 | Y-404 | Y-405 | Y-406 |
|---|---|---|---|---|---|---|
| YI-58 | 35 g | 35 g | 35 g | 35 g | 35 g | 35 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| Urea | 10 g | 10 g | 10 g | 10 g | 10 g | 10 g |
| DEG | 120 g | 150 g | 40 g | 50 g | 50 g | 50 g |
| GR | 115 g | 100 g | 100 g | 100 g | 100 g | 100 g |
| TGB | 130 g | 150 g | 60 g | 50 g | 50 g | 50 g |
| TEA | 8 g | 8 g | 8 g | 8 g | 8 g | 8 g |
| SW | 10 g | 10 g | 10 g | 10 g | 10 g | 10 g |
| PRD | 35 g | 10 g | 10 g | 10 g | 10 g | 10 g |
| IPA | — | — | 50 g | 150 g | — | — |
| MFG | — | — | 100 g | — | 150 g | — |
| MS | — | — | — | — | — | 150 g |
| Finished Amount* | 1 liter | 1 liter | 1 liter | 1 liter | 1 liter | 1 liter |

(Note)
*In all inks, water was added to make 1 liter as the finished amount.
PRD: 2-Pyrrolidone
IPA: 2-Propanol
MFG: 1-Methoxy-2-propanol
MS: 2-Methoxyethanol Also, Dark Yellow Ink Solution DY-401 was prepared by adding Magenta Dye (A) and Cyan Dye (B) in the formulation of Y-401 (Magenta and Cyan Dyes (A) and (B) are the same as those used in Example 1).

[Formulation of Dark Yellow Ink DY-401]

(Solid Contents)

| Yellow Dye (I-58) of the present invention | 35 g/liter |
| Magenta Dye (A) | 2 g/liter |
| Cyan Dye (B) | 2 g/liter |
| Proxel (4,5-benzisothiazolidin-3-one) | 5 g/liter |
| Benzotriazole (BTZ) | 0.08 g/liter |
| Urea | 10 g/liter |

(Liquid Components)

| Triethylene glycol monobutyl ether (DGB) | 140 g/liter |

-continued

[Formulation of Dark Yellow Ink DY-401]

| Glycerin (GR) | 125 g/liter |
| Diethylene glycol (DEG) | 120 g/liter |
| 2-Pyrrolidone (PRD) | 35 g/liter |
| Triethanolamine (TEA) | 8 g/liter |
| Surfynol STG (SW) | 10 g/liter |

Dark Yellow Inks DY-402 to DY-406 were prepared according to the formulation shown in Table 11 below by changing the solvent composition in the ink formulation of DY-401.

TABLE 11

|  | DY-401 | DY-402 | DY-403 | DY-404 | DY-405 | DY-406 |
|---|---|---|---|---|---|---|
| YI-58 | 35 g | 35 g | 35 g | 35 g | 35 g | 35 g |
| Dye A | 2 g | 2 g | 2 g | 2 g | 2 g | 2 g |
| Dye B | 2 g | 2 g | 2 g | 2 g | 2 g | 2 g |
| BTZ | 0.08 g | 0.08 g | 0.08 g | 0.08 g | 0.08 g | 0.08 g |
| PROXEL | 5 g | 5 g | 5 g | 5 g | 5 g | 5 g |
| Urea | 10 g | 10 g | 10 g | 10 g | 10 g | 10 g |
| DEG | 120 g | 150 g | 50 g | 50 g | 50 g | 50 g |
| GR | 125 g | 100 g | 70 g | 70 g | 70 g | 70 g |
| TGB | 140 g | 150 g | 20 g | 20 g | 20 g | 20 g |
| TEA | 8 g | 8 g | 8 g | 8 g | 8 g | 8 g |
| SW | 10 g | 10 g | 10 g | 10 g | 10 g | 10 g |
| PRD | 35 g | 10 g | 10 g | 10 g | 10 g | 10 g |
| IPA | — | — | 80 g | 180 g | — | — |
| MFG | — | — | 100 g | — | 180 g | — |
| MS | — | — | — | — | — | 180 g |
| Finished Amount* | 1 liter | 1 liter | 1 liter | 1 liter | 1 liter | 1 liter |

(Note)
*In all inks, water was added to make 1 liter as the finished amount.

Yellow Inks Y-407 and Y-408 and Dark Yellow Inks DY-407 and DY-408 were produced in the same manner by also using here Yellow Dye C or D as the dye for comparison, which were used as the dye for comparison in Example 1 (the ink composition except for the dye is the same as that of Y-401 or DY-401).

Also, as a reference ink, the yellow ink cartridge and dark yellow ink cartridge of PM-950C produced by Seiko Epson Corporation were used.

By using the dyes above, the yellow inks and dark yellow inks shown in Table 12 below were produced.

TABLE 12

| No. | Yellow Dye |
|---|---|
| PM-950C (Y, DY) (Reference) | — |
| Y-401, DY-401 (Invention) | YI-58 |
| Y-407, DY-407 (Comparison) | C |
| Y-408, DY-408 (Comparison) | D |

These inks each was filled in a yellow ink•dark yellow ink cartridge of an inkjet printer PM-950C manufactured by Seiko Epson Corporation and by using the inks of PM-950C for other colors, the evaluation with an eye of pictorial quality (particularly color tone) and the evaluation of ejection stability and image fastness were performed thoroughly in the same manner as in Example 1 except for differing in the ink sample. Also, the blurring of image drawn was evaluated by the method described in Example 2.

The results obtained are shown in Table 13.

Incidentally, in all samples, the pictorial quality evaluated with an eye was good.

TABLE 13

| No. | Ejection Stability | Fastness to Light | Fastness to Heat | Fastness to $O_3$ | Y Bleeding |
|---|---|---|---|---|---|
| PM-950C (Reference) | A | B | B | C | B |
| Y-401, DY-401 (Invention) | A | A | A | A | B |
| Y-402, DY-402 (Invention) | A | A | A | A | B |
| Y-403, DY-403 (Invention) | A | A | A | A | A |
| Y-404, DY-404 (Invention) | A | A | A | A | A |
| Y-405, DY-405 (Invention) | A | A | A | A | A |
| Y-406, DY-406 (Invention) | A | A | A | A | A |
| Y-407, DY-407 (Comparison) | A | C | B | C | B |
| Y-408, DY-408 (Comparison) | A | C | B | C | B |

As seen from these results, the pair in the ink set using the ink of the present invention is satisfied in the ejection stability and also in all fastness properties to light, heat and ozone, and surpasses Comparative Examples. Among Examples of the present invention, the ink sets in the systems of Y-403/DY-403 to Y-406/DY-406 using a high boiling point solvent and a low boiling point solvent in combination are excellent also in the color bleeding from image, in addition to ejection property and fastness to light, heat and ozone.

Apart from these, when the printed image was compared with the image of a test chart, it was revealed that the color balance was poor in the system using Yellow Dye (D), whereas in all of Examples of the present invention, excellent pictorial quality free from change in color balance was maintained even in a heat and humidity test.

Example 5

Yellow Ink Solution Y-501 according to the following formulation was prepared in the same manner as Y-101 in Example 1.

[Formulation of Yellow Ink Y-501]

(Solid Contents)

| | |
|---|---|
| Yellow Dye (YI-58) of the present invention ($\lambda$max: 445 nm, I($\lambda$max + 70 nm)/I($\lambda$max): 0.013) | 35 g/liter |
| Proxel (4,5-benzisothiazolidin-3-one) | 3.5 g/liter |
| Benzotriazole (BTZ) | 0.08 g/liter |

(Liquid Components)

| | |
|---|---|
| Triethylene glycol monobutyl ether (DGB) | 80 g/liter |
| Glycerin (GR) | 150 g/liter |
| Diethylene glycol (DEG) | 80 g/liter |
| 2-Pyrrolidone | 100 g/liter |
| Triethanolamine (TEA) | 8 g/liter |
| Surfynol STG (SW) | 10 g/liter |

Also, Inks Y-502 to Y-506 were prepared by changing the solvent species of Y-101 as shown in the Table below.

TABLE 14

| | Y-501 | Y-502 | Y-503 | Y-504 | Y-505 | Y-506 |
|---|---|---|---|---|---|---|
| YI-58 | 35 g | 35 g | 35 g | 35 g | 35 g | 35 g |
| BTZ | 0.08 g | 0.08 g | 0.08 g | 0.08 g | 0.08 g | 0.08 g |
| PROXEL | 3.5 g | 3.5 g | 3.5 g | 3.5 g | 3.5 g | 3.5 g |
| DEG | 80 g | 80 g | 100 g | — | — | — |
| GR | 150 g | 150 g | 150 g | 100 g | 100 g | 100 g |
| TGB | 80 g | 80 g | 100 g | 50 g | 50 g | 50 g |
| TEA | 8 g | 8 g | 8 g | 8 g | 8 g | 8 g |
| SW | 10 g | 10 g | 10 g | 10 g | 10 g | 10 g |

TABLE 14-continued

|          | Y-501  | Y-502  | Y-503  | Y-504  | Y-505  | Y-506  |
|----------|--------|--------|--------|--------|--------|--------|
| PRD      | 100 g  | —      | —      | —      | —      | —      |
| TEG      | —      | —      | —      | 100 g  | —      | 50 g   |
| MFG      | —      | —      | —      | —      | 100 g  | 50 g   |
| DMI      | —      | 100 g  | —      | —      | —      | —      |
| Finished Amount* | 1 liter | 1 liter | 1 liter | 1 liter | 1 liter | 1 liter |

(Note)
*In all inks, water was added to make 1 liter as the finished amount.
PRD: 2-Pyrrolidone
DMI: 1,3-Dimethylimidazolidinone
MFG: 1-Methoxy-2-propanol
TEG: Triethylene glycol Also, Dark Yellow Ink Solution DY-501 was prepared by adding Magenta Dye (A) and Cyan Dye (B) in the formulation of Y-501 (Magenta and Cyan Dyes (A) and (B) are the same as those used in Example 1).

[Formulation of Dark Yellow Ink DY-501]

(Solid Contents)

| Yellow Dye (I-58) of the present invention | 35 g/liter |
| Magenta Dye (A) | 2 g/liter |
| Cyan Dye (B) | 2 g/liter |
| Proxel (4,5-benzisothiazolidin-3-one) | 5 g/liter |
| Benzotriazole (BTZ) | 0.08 g/liter |

(Liquid Components)

| Triethylene glycol monobutyl ether (DGB) | 70 g/liter |
| Glycerin (GR) | 160 g/liter |
| Diethylene glycol (DEG) | 80 g/liter |
| 2-Pyrrolidone | 110 g/liter |
| Triethanolamine (TEA) | 8 g/liter |
| Surfynol STG (SW) | 10 g/liter |

Dark Yellow Inks DY-502 to DY-506 were prepared according to the formulation shown in Table 15 below by changing the solvent composition in the ink formulation of DY-501.

TABLE 15

|          | DY-501  | DY-502  | DY-503  | DY-504  | DY-505  | DY-506  |
|----------|---------|---------|---------|---------|---------|---------|
| YI-58    | 35 g    | 35 g    | 35 g    | 35 g    | 35 g    | 35 g    |
| Dye A    | 2 g     | 2 g     | 2 g     | 2 g     | 2 g     | 2 g     |
| Dye B    | 2 g     | 2 g     | 2 g     | 2 g     | 2 g     | 2 g     |
| BTZ      | 0.08 g  | 0.08 g  | 0.08 g  | 0.08 g  | 0.08 g  | 0.08 g  |
| PROXEL   | 5 g     | 5 g     | 5 g     | 5 g     | 5 g     | 5 g     |
| DEG      | 80 g    | 80 g    | 100 g   | —       | —       | —       |
| GR       | 160 g   | 160 g   | 150 g   | 100 g   | 100 g   | 100 g   |
| TGB      | 70 g    | 70 g    | 100 g   | 50 g    | 50 g    | 50 g    |
| TEA      | 8 g     | 8 g     | 8 g     | 8 g     | 8 g     | 8 g     |
| SW       | 10 g    | 10 g    | 10 g    | 10 g    | 10 g    | 10 g    |
| PRD      | 110 g   | —       | —       | —       | —       | —       |
| TEG      | —       | —       | —       | 100 g   | —       | 50 g    |
| MFG      | —       | —       | —       | —       | 100 g   | 50 g    |
| DMI      | —       | 100 g   | —       | —       | —       | —       |
| Finished Amount* | 1 liter | 1 liter | 1 liter | 1 liter | 1 liter | 1 liter |

(Note)
*In all inks, water was added to make 1 liter as the finished amount.

Yellow Inks Y-507 and Y-508 and Dark Yellow Inks DY-507 and DY-508 were produced in the same manner by also using here Yellow Dye C or D as the dye for comparison, which were used as the dye for comparison in Example 1 (the ink composition except for the dye is the same as that of Y-501 or DY-501).

Also, as a reference ink, the yellow ink cartridge and dark yellow ink cartridge of PM-950C produced by Seiko Epson Corporation were used.

By using the dyes above, the yellow inks and dark yellow inks shown in Table 16 below were produced.

TABLE 16

| No. | Yellow Dye |
|-----|------------|
| PM-950C (Y, DY) (Reference) | — |
| Y-501, DY-501 (Invention) | YI-58 |
| Y-507, DY-507 (Comparison) | C |
| Y-508, DY-508 (Comparison) | D |

These inks each was filled in a yellow ink-dark yellow ink cartridge of an inkjet printer PM-950C manufactured by Seiko Epson Corporation and by using the inks of PM-950C for other colors, the evaluation with an eye of pictorial quality (particularly color tone) and the evaluation of ejection stability and image fastness were performed thoroughly in the same manner as in Example 1 except for differing in the ink sample. Also, the blurring of image drawn was evaluated by the method described in Example 2.

The results obtained are shown in Table 17. Incidentally, in all samples, the pictorial quality evaluated with an eye was good.

TABLE 17

| No. | Ejection Stability | Fastness to Light | Fastness to Heat | Fastness to $O_3$ | Y Bleeding |
|---|---|---|---|---|---|
| PM-950C (Reference) | A | B | B | C | B |
| Y-501, DY-501 (Invention) | A | A | A | A | B |
| Y-502, DY-502 (Invention) | A | A | A | A | B |
| Y-503, DY-503 (Invention) | A | A | A | A | A |
| Y-504, DY-504 (Invention) | A | A | A | A | A |
| Y-505, DY-505 (Invention) | A | A | A | A | A |
| Y-506, DY-506 (Invention) | A | A | A | A | A |
| Y-507, DY-507 (Comparison) | A | C | B | C | B |
| Y-508, DY-508 (Comparison) | A | C | B | C | B |

As seen from the results in the Table, the pair in the ink set using the ink of the present invention is satisfied in the ejection stability and also in all fastness properties to light, heat and ozone, and surpasses Comparative Examples. Among Examples of the present invention, the systems of Y-503/DY-503 to Y-506/DY-506 using a solvent constituted by an organic solvent not containing a heteroatom other than oxygen atom are excellent also in the color bleeding from image, in addition to ejection property and fastness to light, heat and ozone.

Apart from these, when the printed image was compared with the image of a test chart, it was revealed that the color balance was poor in the system using Yellow Dye (D), whereas in all of Examples of the present invention, excellent pictorial quality free from change in color balance was maintained even in a heat and humidity test.

Example 6

Yellow Ink Solution Y-601 according to the following formulation was prepared in the same manner as Y-101 in Example 1.

[Formulation of Yellow Ink Y-601]

(Solid Contents)

| | |
|---|---|
| Yellow Dye (YI-58) of the present invention ($\lambda$max: 445 nm, I($\lambda$max + 70 nm)/I($\lambda$max): 0.013) | 35 g/liter |
| Proxel (4,5-benzisothiazolidin-3-one) | 3.5 g/liter |
| Benzotriazole (BTZ) | 0.08 g/liter |
| Urea | 10 g/liter |

(Liquid Components)

| | |
|---|---|
| Triethylene glycol monobutyl ether (DGB) | 130 g/liter |
| Glycerin (GR) | 115 g/liter |
| Diethylene glycol (DEG) | 120 g/liter |
| 2-Pyrrolidone | 35 g/liter |
| Triethanolamine (TEA) | 8 g/liter |
| Surfynol STG (SW) | 10 g/liter |

Also, Inks Y-602 to Y-606 were prepared by changing the solvent species of Y-601 as shown in the Table below.

TABLE 18

| | Y-601 | Y-602 | Y-603 | Y-604 | Y-605 | Y-606 |
|---|---|---|---|---|---|---|
| YI-58 | 35 g | 35 g | 35 g | 35 g | 35 g | 35 g |
| BTZ | 0.1 g | 0.1 g | 0.1 g | 0.1 g | 0.1 g | 0.1 g |
| Urea | 10 g | 10 g | 10 g | 10 g | 10 g | 10 g |
| PROXEL | 1 g | 1 g | 1 g | 1 g | 1 g | 1 g |
| DEG | 120 g | 100 g | 75 g | — | — | — |
| GR | 150 g | 200 g | 200 g | 200 g | 200 g | 200 g |
| TGB | 150 g | 100 g | 75 g | — | — | — |
| PFG | — | — | — | 150 g | 100 g | — |
| MFG | — | — | — | — | 100 g | 150 g |
| TEA | 8 g | 8 g | 8 g | 8 g | 8 g | 8 g |
| SW | 10 g | 10 g | 10 g | 10 g | 10 g | 10 g |
| Finished Amount* | 1 liter | 1 liter | 1 liter | 1 liter | 1 liter | 1 liter |
| D** | 27.8 | 20.8 | 15.7 | 0.8 | 0.8 | 0.8 |

(Note)
*In all inks, water was added to make 1 liter as the finished amount.
**The concentration (mass %) of the solvent in which Dye (YI-58) has a solubility of 10 g/100 g-solvent or more at 25° C.
PFG: Propylene glycol monopropyl ether
DGE: Diethylene glycol monoethyl ether
MFG: 1-Methoxy-2-propanol Solvent in which Dye (YI-58) has a solubility of 10 g/100 g-solvent or more at 25° C.:

Three solvents TGB, DEG and TEA

Also, Dark Yellow Ink Solution DY-601 was prepared by adding Magenta Dye (A) and Cyan Dye (B) in the formulation of Y-601 (Magenta and Cyan Dyes (A) and (B) are the same as those used in Example 1).

[Formulation of Dark Yellow Ink DY-601]

(Solid Contents)

| | |
|---|---|
| Yellow Dye (I-58) of the present invention | 35 g/liter |
| Magenta Dye (A) | 2 g/liter |
| Cyan Dye (B) | 2 g/liter |
| Proxel (4,5-benzisothiazolidin-3-one) | 5 g/liter |

-continued

[Formulation of Dark Yellow Ink DY-601]

| | |
|---|---|
| Benzotriazole (BTZ) | 0.08 g/liter |
| Urea | 10 g/liter |
| (Liquid Components) | |
| Triethylene glycol monobutyl ether (DGB) | 140 g/liter |
| Glycerin (GR) | 125 g/liter |
| Diethylene glycol (DEG) | 120 g/liter |
| 2-Pyrrolidone | 35 g/liter |
| Triethanolamine (TEA) | 8 g/liter |
| Surfynol STG (SW) | 10 g/liter |

Dark Yellow Inks DY-602 to DY-606 were prepared according to the formulation shown in Table 19 below by changing the solvent composition in the ink formulation of DY-601.

TABLE 19

| | DY-601 | DY-602 | DY-603 | DY-604 | DY-605 | DY-606 |
|---|---|---|---|---|---|---|
| YI-58 | 35 g | 35 g | 35 g | 35 g | 35 g | 35 g |
| Dye A | 2 g | 2 g | 2 g | 2 g | 2 g | 2 g |
| Dye B | 2 g | 2 g | 2 g | 2 g | 2 g | 2 g |
| BTZ | 0.1 g | 0.1 g | 0.1 g | 0.1 g | 0.1 g | 0.1 g |
| Urea | 10 g | 10 g | 10 g | 10 g | 10 g | 10 g |
| PROXEL | 1 g | 1 g | 1 g | 1 g | 1 g | 1 g |
| DEG | 150 g | 120 g | 80 g | — | — | — |
| GR | 150 g | 200 g | 200 g | 220 g | 220 g | 220 g |
| TGB | 160 g | 120 g | 80 g | — | — | — |
| PFG | — | — | — | 150 g | 100 g | — |
| MFG | — | — | — | — | 100 g | 150 g |
| TEA | 8 g | 8 g | 8 g | 8 g | 8 g | 8 g |
| SW | 10 g | 10 g | 10 g | 10 g | 10 g | 10 g |
| Finished Amount* | 1 liter | 1 liter | 1 liter | 1 liter | 1 liter | 1 liter |
| D** | 31.8 | 24.8 | 16.7 | 0.8 | 0.8 | 0.8 |

(Note)
*In all inks, water was added to make 1 liter as the finished amount.
**The concentration (mass %) of the solvent in which Dye (YI-58) has a solubility of 10 g/100 g-solvent or more at 25° C.

Yellow Inks Y-607 and Y-608 and Dark Yellow Inks DY-607 and DY-608 were produced in the same manner by also using here Yellow Dye C or D as the dye for comparison, which were used as the dye for comparison in Example 1 (the ink composition except for the dye is the same as that of Y-601 or DY-601).

Also, as a reference ink, the yellow ink cartridge and dark yellow ink cartridge of PM-950C produced by Seiko Epson Corporation were used.

These inks each was filled in a yellow ink-dark yellow ink cartridge of an inkjet printer PM-950C manufactured by Seiko Epson Corporation and by using the inks of PM-950C for other colors, the evaluation with an eye of pictorial quality (particularly color tone) and the evaluation of ejection stability and image fastness were performed thoroughly in the same manner as in Example 1 except for differing in the ink sample. Also, the blurring of image drawn was evaluated by the method described in Example 4.

The results obtained are shown in Table 20. Incidentally, in all samples, the pictorial quality evaluated with an eye was good.

TABLE 20

| No. | Ejection Stability | Fastness to Light | Fastness to Heat | Fastness to $O_3$ | Y Bleeding |
|---|---|---|---|---|---|
| PM-950C (Y, DY) (Reference) | A | B | B | C | B |
| Y-601, DY-601 (Invention) | A | A | A | A | B |
| Y-602, DY-602 (Invention) | A | A | A | A | B |
| Y-603, DY-603 (Invention) | A | A | A | A | B |
| Y-604, DY-604 (Invention) | A | A | A | A | A |
| Y-605, DY-605 (Invention) | A | A | A | A | A |
| Y-606, DY-606 (Comparison) | A | A | A | A | A |
| Y-607, DY-607 (Comparison) | A | B | B | B | C |
| Y-608, DY-608 (Comparison) | A | B | B | C | C |

As seen from the results in the Table, the pair in the ink set using the ink of the present invention is prevented from color bleeding from image and satisfied in the ejection stability and also in all fastness properties to light, heat and ozone, and surpasses Comparative Examples. Among Examples of the present invention, the systems of Y-604/DY-604 to Y-606/DY-606 using the solvent in which Dye (YI-58) has a solubility of 10 g/100 g-solvent or more at 25° C., in a concentration of 10 mass % or less are excellent also in the color bleeding from image, in addition to ejection property and fastness to light, heat and ozone.

Apart from these, when the printed image was compared with the image of a test chart, it was revealed that the color balance was poor in the system using Yellow Dye (D), whereas in all of Examples of the present invention, excellent pictorial quality free from change in color balance was maintained even in a heat and humidity test.

INDUSTRIAL APPLICABILITY

The ink of the present invention comprising an aqueous medium containing a yellow dye, particularly, a yellow dye represented by formula (1), having spectral absorption characteristics such that the maximum absorption wavelength is in the region from 390 to 470 nm and the absorption long-wave end has a tailing of a specified value or less, and antioxidative characteristics such that the ozone enforced discoloration rate constant is $5.0 \times 10^{-2}$ [hour$^{-1}$] or less, is an inkjet recording ink ensuring excellent ejection stability even after aging of the ink and also exhibiting excellent weather resistance.

In addition to these good properties, the ink of the present invention is excellent in view of less blurring of the image drawn.

In the image drawn by using the yellow and dark yellow inks of the present invention in combination with magenta and cyan inks, the pictorial quality with excellent color balance is maintained even when the image is aged.

The invention claimed is:

1. An inkjet recording ink comprising an aqueous medium having dissolved and/or dispersed therein at least one dye having λmax in a region of from 390 to 470 nm and having a ratio of an absorbance I(λmax+70 nm) at λmax+70 nm to an absorbance I(λmax) at λmax, namely, I(λmax+70 nm)/I(λmax), of 0.4 or less, wherein when a reflection density after printing an image with the ink on a reflective image-receiving medium is measured through a Status A blue filter and a point having a reflection density ($D_B$) of 0.90 to 1.10 in a yellow region is defined as an initial density of the ink and when the printed image is enforcedly discolored by using an ozone discoloration tester capable of always generating 5 ppm of ozone and an enforced discoloration rate constant is determined from a time until the reflection density decreases to 80% of the initial density, the enforced discoloration rate constant is $5.0 \times 10^{-2}$ [hour$^{-1}$] or less.

2. The inkjet recording ink as claimed in claim 1, wherein the ratio of the absorbance I(λmax+70 nm) at λmax+70 nm to the absorbance I(λmax) at λmax, namely, I(λmax+70 nm)/I(λmax), is 0.2 or less.

3. A yellow ink for inkjet recording as claimed in claim 1, wherein an oxidation potential of the dye is nobler than 1.0 V (vs SCE).

4. The inkjet recording ink as claimed in claim 1, which comprises at least one compound represented by the following formula (A):

Formula (A):

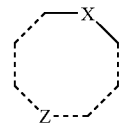

wherein X represents a carbonyl- or heteroatom-containing group and Z represents an atomic group capable of constituting a cyclic organic material.

5. The inkjet recording ink as claimed in claim 1, which comprises at least one compound represented by the following formula (B):

X-Y-Z wherein X represents a group represented by —N(Q$_1$)-Q$_2$, Z represents a group represented by —N(Q$_1$)-Q$_2$ or —O-Q$_3$, Y represents a group represented by —W-(G)$_k$—(H)$_n$—, W and H each represents a group represented by —CO—, —SO$_2$— or —PO(Q$_4$)-, G represents a divalent linking group, Q$_1$ to Q$_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group, X and Z may combine with each other to form a ring, and k and n each represents 0 or 1.

6. The inkjet recording ink as claimed in claim 5, which comprises two or more different antiseptics.

7. The inkjet recording ink as claimed in claim 1, which comprises at least one antiseptic.

8. The inkjet recording ink as claimed in claim 1, which comprises an organic solvent having a boiling point of 150° C. or more.

9. The inkjet recording ink as claimed in claim 1, which comprises at least one organic solvent having a boiling point of 150° C. or more and at least one organic solvent having a boiling point of less than 150° C.

10. The inkjet recording ink as claimed in claim 9, wherein at least one organic solvent having a boiling point of less than 150° C. is an alcohol derivative.

11. The inkjet recording ink as claimed in claim 1, wherein at least one organic solvent having a boiling point of 150° C. or more is an alcohol derivative.

12. The inkjet recording ink as claimed in claim 1, which comprises at least one organic solvent not containing a heteroatom other than an oxygen atom.

13. The inkjet recording ink as claimed in claim 1, wherein a water-miscible organic solvent in which the dye has a solubility of 10 (g/100 g-solvent) or more at 25° C. is contained in an amount of 10 mass % or less based on a composition of the ink.

14. An inkjet recording method comprising using the inkjet recording ink claimed in claim 1.

15. An inkjet recording method comprising ejecting ink droplets according to recording signals on an image-receiving material to record an image on the image-receiving material, the image-receiving material comprising a support having thereon an image-receiving layer containing an inorganic white pigment particle, wherein the ink droplet comprises the inkjet recording ink claimed in claim 1.

16. An inkjet recording ink comprising an aqueous medium having dissolved and/or dispersed therein at least one dye having λmax in a region of from 390 to 470 nm and represented by the following formula (1):

A-N=N=B  Formula (1):

wherein A and B each independently represents a heterocyclic group which may be substituted; and
at least one compound represented by the following formula (A):

Formula (A):

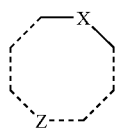

wherein X represents a carbonyl- or heteroatom-containing group and Z represents an atomic group capable of constituting a cyclic organic material.

17. The inkjet recording ink as claimed in claim 16, wherein an enforced discoloration rate constant of the ink for an ozone gas determined in a region of an image printed with the ink on a reflective image-receiving medium is $5.0 \times 10^{-2}$ [hour$^{-1}$] or less.

18. The inkjet recording ink as claimed in claim 16, wherein a ratio of an absorbance I(λmax+70 nm) at λmax+70 nm to an absorbance I(λmax) at λmax, namely, I(λmax+70 nm)/I(λmax), is 0.4 or less.

19. The inkjet recording ink as claimed in claim 18, wherein the ratio of the absorbance I(λmax+70 nm) at λmax+70 nm to the absorbance I(λmax) at λmax, namely, I(λmax+70 nm)/I(λmax), is 0.2 or less.

20. The yellow ink for inkjet recording as claimed in claim 16, wherein an oxidation potential of the dye is nobler than 1.0 V (vs SCE).

21. The inkjet recording ink as claimed in claim 16, which comprises at least one compound represented by the following formula (B):

X-Y-Z  Formula (B):

wherein X represents a group represented by —N(Q$_1$)-Q$_2$, Z represents a group represented by —N(Q$_1$)-Q$_2$ or —O-Q$_3$, Y represents a group represented by —W-(G)$_k$—(H)$_n$—, W and H each represents a group represented by —CO—, —SO$_2$— or —PO(Q$_4$)-, G represents a divalent linking group, Q$_1$ to Q$_4$ each represents a hydrogen atom, an amino group, an alkyl group, an alkenyl group, an alkynyl group, an aryl group, a heterocyclic group, a heteroaryl group, an alkoxy group, an aryloxy group, a heterocyclic oxy group, a heteroaryloxy group, an alkylamino group, an arylamino group, a heterocyclic amino group or a heteroarylamino group, X and Z may combine with each other to form a ring, and k and n each represents 0 or 1.

22. The inkjet recording ink as claimed in claim 16, which comprises at least one antiseptic.

23. The inkjet recording ink as claimed in claim 22, which comprises two or more different antiseptics.

24. The inkjet recording ink as claimed in claim 16, which comprises an organic solvent having a boiling point of 150° C. or more.

25. The inkjet recording ink as claimed in claim 24, wherein at least one organic solvent having a boiling point of 150° C. or more is an alcohol derivative.

26. The inkjet recording ink as claimed in claim 16, which comprises at least one organic solvent having a boiling point of 150° C. or more and at least one organic solvent having a boiling point of less than 150° C.

27. The inkjet recording ink as claimed in claim 26, wherein at least one organic solvent having a boiling point of less than 150° C. is an alcohol derivative.

28. The inkjet recording ink as claimed in claim 16, which comprises at least one organic solvent not containing a heteroatom other than an oxygen atom.

29. The inkjet recording ink as claimed in claim 16, wherein a water-miscible organic solvent in which the dye has a solubility of 10 (g/100 g-solvent) or more at 25° C. is contained in an amount of 10 mass % or less based on a composition of the ink.

* * * * *